United States Patent
Lee et al.

(10) Patent No.: US 12,232,161 B2
(45) Date of Patent: Feb. 18, 2025

(54) METHOD AND APPARATUS FOR TRANSMISSION BASED ON QoS REQUIREMENT IN A WIRELESS COMMUNICATION SYSTEM

(71) Applicant: LG ELECTRONICS INC., Seoul (KR)

(72) Inventors: Youngdae Lee, Seoul (KR); Giwon Park, Seoul (KR); Hanbyul Seo, Seoul (KR); Jongyoul Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 406 days.

(21) Appl. No.: 17/642,599

(22) PCT Filed: Oct. 8, 2020

(86) PCT No.: PCT/KR2020/013710
§ 371 (c)(1),
(2) Date: Mar. 11, 2022

(87) PCT Pub. No.: WO2021/071267
PCT Pub. Date: Apr. 15, 2021

(65) Prior Publication Data
US 2022/0338205 A1 Oct. 20, 2022

Related U.S. Application Data

(60) Provisional application No. 62/913,714, filed on Oct. 10, 2019.

(51) Int. Cl.
*H04W 72/56* (2023.01)
*H04W 28/02* (2009.01)
*H04W 72/543* (2023.01)

(52) U.S. Cl.
CPC ....... *H04W 72/56* (2023.01); *H04W 28/0268* (2013.01); *H04W 72/543* (2023.01)

(58) Field of Classification Search
CPC ............... H04W 72/56; H04W 72/543; H04W 28/0268
See application file for complete search history.

(56) References Cited

U.S. PATENT DOCUMENTS

2017/0257876 A1   9/2017 Loehr et al.
2019/0150176 A1*  5/2019 Pelletier ............ H04W 28/0278
                                                               370/329
(Continued)

FOREIGN PATENT DOCUMENTS

KR   20170080580 A   7/2017

OTHER PUBLICATIONS

"Support of QoS for PC5-based V2X transport", Huawei, HiSilicon, 3GPP TSG-RAN WG2 Meeting #95, Gothenburg, Sweden, Aug. 22-26, 2016. R2-164917.

(Continued)

*Primary Examiner* — Ajay Cattungal
(74) *Attorney, Agent, or Firm* — BRYAN CAVE LEIGHTON PAISNER LLP

(57) ABSTRACT

A method and apparatus for transmission based on QoS requirement in a wireless communication system is provided. A wireless device sets a priority level of a logical channel. A wireless device detects that Quality of Service (QoS) requirement of the logical channel is not met. A wireless device de-prioritizes the priority level of the logical channel. A wireless device performs the SL transmission and/or the UL transmission for the logical channel with the de-prioritized priority level.

18 Claims, 16 Drawing Sheets

(56) References Cited

U.S. PATENT DOCUMENTS

| | | | | |
|---|---|---|---|---|
| 2021/0029723 A1* | 1/2021 | Wu | ................... | H04W 72/569 |
| 2021/0105743 A1* | 4/2021 | Lin | ..................... | H04W 72/02 |
| 2021/0368565 A1* | 11/2021 | Wu | ..................... | H04L 5/0055 |
| 2021/0385694 A1* | 12/2021 | Freda | .................. | H04W 28/26 |
| 2022/0104209 A1* | 3/2022 | Lee | ................... | H04W 72/542 |
| 2022/0353902 A1* | 11/2022 | Lee | ......................... | H04L 1/08 |

OTHER PUBLICATIONS

"Logical channel prioritization", Spreadtrum Communications, 3GPP TSG-RAN WG2 Meeting #107, Prague, CZ, Aug. 26-Aug. 30, 2019. R2-1909098, Revision of R2-1905680.

"Remaining issue for prioritization for NR V2X", Lenovo, Motorola Mobility, 3GPP TSG-RAN WG2 Meeting #107bis, ChongQing, China, Oct. 14-18, 2019. R2-1912913, update of R2-1910283.

"3rd Generation Partnership Project; Technical Specification Group Services and System Aspects; Architecture enhancements for 5G System (5GS) to support Vehicle-to-Everything (V2X) services (Release 16)". 3GPP TS 23.287 V16.0.0 (Sep. 2019). pp. 1-49.

3rd Generation Partnership Project; Technical Specification Group Radio Access Network; NR; Study on NR Vehicle-to-Everything (V2X) (Release 16). 3GPP TR 38.885 V16.0.0 (Mar. 2019). pp. 1-122.

* cited by examiner

METHOD AND APPARATUS FOR TRANSMISSION BASED ON QoS REQUIREMENT IN A WIRELESS COMMUNICATION SYSTEM

This application is a National Stage filing of International Application No. PCT/KR2020/013710, filed Oct. 8, 2020, which claims priority to U.S. Provisional Application No. 62/913,714, filed on Oct. 10, 2019, all of which are incorporated by reference in their entirety herein.

BACKGROUND

Technical Field

The present disclosure relates to a method and apparatus for transmission based on QoS requirement in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

SUMMARY

Technical Objects

A wireless device could communicate with another wireless device via V2X communication. For example, a receiving user equipment (RX UE) may receive a sidelink message from a transmitting UE (TX UE). The RX UE and the TX UE may be decided relatively. For example, when a UE receives a sidelink message from another UE, the UE could be a RX UE. For other example, when the UE transmits a sidelink message to another UE, the UE may could be a TX UE.

When a RX UE detects that sidelink reception from a TX UE cannot meet quality of service (QoS) requirement, the RX UE may not need to send HARQ feedback to the TX UE. In this case, however, the TX UE may not consider the QoS quality in the sidelink transmission.

Therefore, studies for transmission based on QoS requirement in a wireless communication system.

Technical Solutions

In an aspect, a method performed by a wireless device in a wireless communication system is provided. A wireless device sets a priority level of a logical channel. A wireless device detects that Quality of Service (QoS) requirement of the logical channel is not met. A wireless device de-prioritizes the priority level of the logical channel. A wireless device performs the SL transmission and/or the UL transmission for the logical channel with the de-prioritized priority level.

In another aspect, an apparatus for implementing the above method is provided.

Technical Effects

The present disclosure can have various advantageous effects.

According to some embodiments of the present disclosure, a wireless device could perform uplink (UL) transmission and/or (SL) sidelink transmission efficiently based on QoS requirement in a wireless communication system.

For example, a wireless device could perform prioritization and/or de-prioritization in UL transmission and/or SL transmission by adjusting the priority of logical channel for UL transmissions and/or SL transmissions.

For example, a wireless device could perform prioritization and/or de-prioritization when QoS requirement of the logical channel cannot be temporarily met.

For example, a wireless communication system could provide de-prioritization based on adjustment of a priority of a packet for a wireless device performing transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

DETAILED DESCRIPTION

Figure 1:
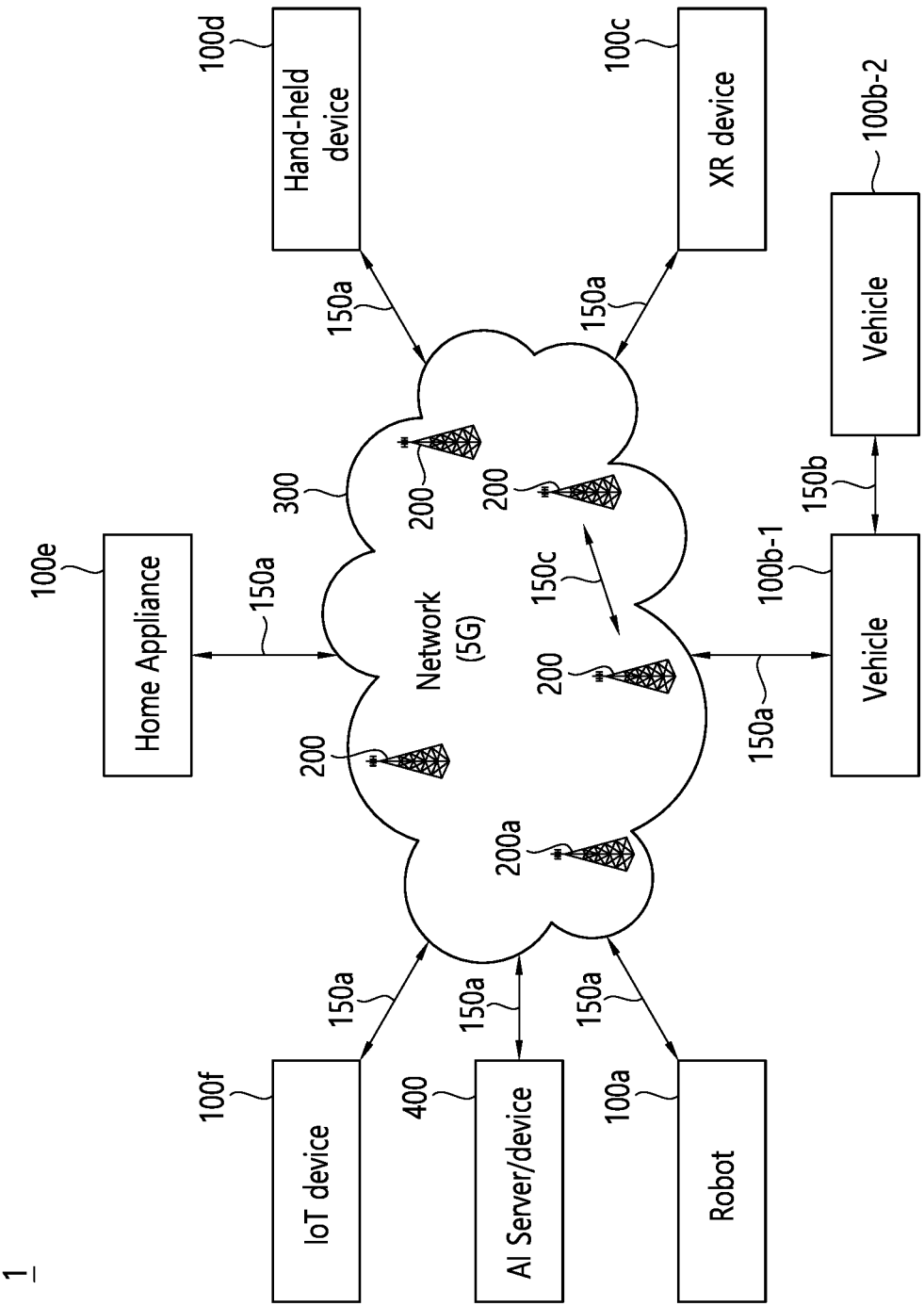
FIG. 1 shows an example of a communication system to which implementations of the present disclosure is applied.

The following techniques, apparatuses, and systems may be applied to a variety of wireless multiple access systems. Examples of the multiple access systems include a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, and a multicarrier frequency division multiple access (MC-FDMA) system. CDMA may be embodied through radio technology such as universal terrestrial radio access (UTRA) or CDMA2000. TDMA may be embodied through radio technology such as global system for mobile communications (GSM), general packet radio service (GPRS), or enhanced data rates for GSM evolution (EDGE). OFDMA may be embodied through radio technology such as institute of electrical and electronics engineers (IEEE) 802.11 (Wi-Fi), IEEE 802.16 (WiMAX), IEEE 802.20, or evolved UTRA (E-UTRA). UTRA is apart of a universal mobile telecommunications system (UMTS). 3rd generation partnership project (3GPP) long term evolution (LTE) is a part of evolved UMTS (E-UMTS) using E-UTRA. 3GPP LTE employs OFDMA in DL and SC-FDMA in UL. LTE-advanced (LTE-A) is an evolved version of 3GPP LTE.

For convenience of description, implementations of the present disclosure are mainly described in regards to a 3GPP based wireless communication system. However, the technical features of the present disclosure are not limited thereto. For example, although the following detailed description is given based on a mobile communication system corresponding to a 3GPP based wireless communication system, aspects of the present disclosure that are not limited to 3GPP based wireless communication system are applicable to other mobile communication systems.

For terms and technologies which are not specifically described among the terms of and technologies employed in the present disclosure, the wireless communication standard documents published before the present disclosure may be referenced.

In the present disclosure, "A or B" may mean "only A", "only B", or "both A and B". In other words, "A or B" in the present disclosure may be interpreted as "A and/or B". For example, "A, B or C" in the present disclosure may mean "only A", "only B", "only C", or "any combination of A, B and C".

In the present disclosure, slash (/) or comma (,) may mean "and/or". For example, "A/B" may mean "A and/or B". Accordingly, "A/B" may mean "only A", "only B", or "both A and B". For example, "A, B, C" may mean "A, B or C".

In the present disclosure, "at least one of A and B" may mean "only A", "only B" or "both A and B". In addition, the expression "at least one of A or B" or "at least one of A and/or B" in the present disclosure may be interpreted as same as "at least one of A and B".

In addition, in the present disclosure, "at least one of A, B and C" may mean "only A", "only B", "only C", or "any combination of A, B and C". In addition, "at least one of A, B or C" or "at least one of A, B and/or C" may mean "at least one of A, B and C".

Also, parentheses used in the present disclosure may mean "for example". In detail, when it is shown as "control information (PDCCH)", "PDCCH" may be proposed as an example of "control information". In other words, "control information" in the present disclosure is not limited to "PDCCH", and "PDDCH" may be proposed as an example of "control information". In addition, even when shown as "control information (i.e., PDCCH)", "PDCCH" may be proposed as an example of "control information".

Technical features that are separately described in one drawing in the present disclosure may be implemented separately or simultaneously.

Although not limited thereto, various descriptions, functions, procedures, suggestions, methods and/or operational flowcharts of the present disclosure disclosed herein can be applied to various fields requiring wireless communication and/or connection (e.g., 5G) between devices.

Hereinafter, the present disclosure will be described in more detail with reference to drawings. The same reference numerals in the following drawings and/or descriptions may refer to the same and/or corresponding hardware blocks, software blocks, and/or functional blocks unless otherwise indicated.

FIG. 1 shows an example of a communication system to which implementations of the present disclosure is applied.

The 5G usage scenarios shown in FIG. 1 are only exemplary, and the technical features of the present disclosure can be applied to other 5G usage scenarios which are not shown in FIG. 1.

Three main requirement categories for 5G include (1) a category of enhanced mobile broadband (eMBB), (2) a category of massive machine type communication (mMTC), and (3) a category of ultra-reliable and low latency communications (URLLC).

Partial use cases may require a plurality of categories for optimization and other use cases may focus only upon one key performance indicator (KPI). 5G supports such various use cases using a flexible and reliable method.

eMBB far surpasses basic mobile Internet access and covers abundant bidirectional work and media and entertainment applications in cloud and augmented reality. Data is one of 5G core motive forces and, in a 5G era, a dedicated voice service may not be provided for the first time. In 5G, it is expected that voice will be simply processed as an application program using data connection provided by a communication system. Main causes for increased traffic volume are due to an increase in the size of content and an increase in the number of applications requiring high data transmission rate. A streaming service (of audio and video), conversational video, and mobile Internet access will be more widely used as more devices are connected to the Internet. These many application programs require connectivity of an always turned-on state in order to push real-time information and alarm for users. Cloud storage and applications are rapidly increasing in a mobile communication platform and may be applied to both work and entertainment. The cloud storage is a special use case which accelerates growth of uplink data transmission rate. 5G is also used for remote work of cloud. When a tactile interface is used, 5G demands much lower end-to-end latency to maintain user good experience. Entertainment, for example, cloud gaming and video streaming, is another core element which increases demand for mobile broadband capability. Entertainment is essential for a smartphone and a tablet in any place including high mobility environments such as a train, a vehicle, and an airplane. Other use cases are augmented reality for entertainment and information search. In this case, the augmented reality requires very low latency and instantaneous data volume.

In addition, one of the most expected 5G use cases relates a function capable of smoothly connecting embedded sensors in all fields, i.e., mMTC. It is expected that the number of potential Internet-of-things (IoT) devices will reach 204 hundred million up to the year of 2020. An industrial IoT is one of categories of performing a main role enabling a smart city, asset tracking, smart utility, agriculture, and security infrastructure through 5G.

URLLC includes a new service that will change industry through remote control of main infrastructure and an ultra-reliable/available low-latency link such as a self-driving vehicle. A level of reliability and latency is essential to control a smart grid, automatize industry, achieve robotics, and control and adjust a drone.

5G is a means of providing streaming evaluated as a few hundred megabits per second to gigabits per second and may complement fiber-to-the-home (FTTH) and cable-based broadband (or DOCSIS). Such fast speed is needed to deliver TV in resolution of 4K or more (6K, 8K, and more), as well as virtual reality and augmented reality. Virtual reality (VR) and augmented reality (AR) applications include almost immersive sports games. A specific application program may require a special network configuration. For example, for VR games, gaming companies need to incorporate a core server into an edge network server of a network operator in order to minimize latency.

Automotive is expected to be a new important motivated force in 5G together with many use cases for mobile communication for vehicles. For example, entertainment for passengers requires high simultaneous capacity and mobile broadband with high mobility. This is because future users continue to expect connection of high quality regardless of their locations and speeds. Another use case of an automotive field is an AR dashboard. The AR dashboard causes a driver to identify an object in the dark in addition to an object seen from a front window and displays a distance from the object and a movement of the object by overlapping information talking to the driver. In the future, a wireless module enables communication between vehicles, information exchange between a vehicle and supporting infrastructure, and information exchange between a vehicle and other connected devices (e.g., devices accompanied by a pedestrian). A safety system guides alternative courses of a behavior so that a driver may drive more safely drive, thereby lowering the danger of an accident. The next stage will be a remotely controlled or self-driven vehicle. This requires very high reliability and very fast communication between different self-driven vehicles and between a vehicle and infrastructure. In the future, a self-driven vehicle will perform all driving activities and a driver will focus only upon abnormal traffic that the vehicle cannot identify. Technical requirements of a self-driven vehicle demand ultra-low latency and ultra-high reliability so that traffic safety is increased to a level that cannot be achieved by human being.

A smart city and a smart home/building mentioned as a smart society will be embedded in a high-density wireless sensor network. A distributed network of an intelligent sensor will identify conditions for costs and energy-efficient maintenance of a city or a home. Similar configurations may be performed for respective households. All of temperature sensors, window and heating controllers, burglar alarms, and home appliances are wirelessly connected. Many of these sensors are typically low in data transmission rate, power, and cost. However, real-time HD video may be demanded by a specific type of device to perform monitoring.

Consumption and distribution of energy including heat or gas is distributed at a higher level so that automated control of the distribution sensor network is demanded. The smart grid collects information and connects the sensors to each other using digital information and communication technology so as to act according to the collected information. Since this information may include behaviors of a supply company and a consumer, the smart grid may improve distribution of fuels such as electricity by a method having efficiency, reliability, economic feasibility, production sustainability, and automation. The smart grid may also be regarded as another sensor network having low latency.

Mission critical application (e.g., e-health) is one of 5G use scenarios. A health part contains many application programs capable of enjoying benefit of mobile communication. A communication system may support remote treatment that provides clinical treatment in a faraway place. Remote treatment may aid in reducing a barrier against distance and improve access to medical services that cannot be continuously available in a faraway rural area. Remote treatment is also used to perform important treatment and save lives in an emergency situation. The wireless sensor network based on mobile communication may provide remote monitoring and sensors for parameters such as heart rate and blood pressure.

Wireless and mobile communication gradually becomes important in the field of an industrial application. Wiring is high in installation and maintenance cost. Therefore, a possibility of replacing a cable with reconstructible wireless links is an attractive opportunity in many industrial fields. However, in order to achieve this replacement, it is necessary for wireless connection to be established with latency, reliability, and capacity similar to those of the cable and management of wireless connection needs to be simplified. Low latency and a very low error probability are new requirements when connection to 5G is needed.

Logistics and freight tracking are important use cases for mobile communication that enables inventory and package tracking anywhere using a location-based information system. The use cases of logistics and freight typically demand low data rate but require location information with a wide range and reliability.

Referring to FIG. 1, the communication system 1 includes wireless devices 100a to 100f, base stations (BSs) 200, and a network 300. Although FIG. 1 illustrates a 5G network as an example of the network of the communication system 1, the implementations of the present disclosure are not limited to the 5G system, and can be applied to the future communication system beyond the 5G system.

The BSs 200 and the network 300 may be implemented as wireless devices and a specific wireless device may operate as a BS/network node with respect to other wireless devices.

The wireless devices 100a to 100f represent devices performing communication using radio access technology (RAT) (e.g., 5G new RAT (NR)) or LTE) and may be referred to as communication/radio/5G devices. The wireless devices 100a to 100f may include, without being limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of performing communication between vehicles. The vehicles may include an unmanned aerial vehicle (UAV) (e.g., a drone). The XR device may include an AR/VR/Mixed Reality (MR) device and may be implemented in the form of a head-mounted device (HMD), a head-up display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter.

In the present disclosure, the wireless devices 100a to 100f may be called user equipments (UEs). A UE may include, for example, a cellular phone, a smartphone, a laptop computer, a digital broadcast terminal, a personal digital assistant (PDA), a portable multimedia player (PMP), a navigation system, a slate personal computer (PC), a tablet PC, an ultrabook, a vehicle, a vehicle having an autonomous traveling function, a connected car, an UAV, an AI module, a robot, an AR device, a VR device, an MR device, a hologram device, a public safety device, an MTC device, an IoT device, a medical device, a FinTech device (or a financial device), a security device, a weather/environment device, a device related to a 5G service, or a device related to a fourth industrial revolution field.

The UAV may be, for example, an aircraft aviated by a wireless control signal without a human being onboard.

The VR device may include, for example, a device for implementing an object or a background of the virtual world. The AR device may include, for example, a device implemented by connecting an object or a background of the virtual world to an object or a background of the real world. The MR device may include, for example, a device implemented by merging an object or a background of the virtual world into an object or a background of the real world. The hologram device may include, for example, a device for implementing a stereoscopic image of 360 degrees by recording and reproducing stereoscopic information, using an interference phenomenon of light generated when two laser lights called holography meet.

The public safety device may include, for example, an image relay device or an image device that is wearable on the body of a user.

The MTC device and the IoT device may be, for example, devices that do not require direct human intervention or manipulation. For example, the MTC device and the IoT device may include smartmeters, vending machines, thermometers, smartbulbs, door locks, or various sensors.

The medical device may be, for example, a device used for the purpose of diagnosing, treating, relieving, curing, or preventing disease. For example, the medical device may be a device used for the purpose of diagnosing, treating, relieving, or correcting injury or impairment. For example, the medical device may be a device used for the purpose of inspecting, replacing, or modifying a structure or a function. For example, the medical device may be a device used for the purpose of adjusting pregnancy. For example, the medical device may include a device for treatment, a device for operation, a device for (in vitro) diagnosis, a hearing aid, or a device for procedure.

The security device may be, for example, a device installed to prevent a danger that may arise and to maintain safety. For example, the security device may be a camera, a closed-circuit TV (CCTV), a recorder, or a black box.

The FinTech device may be, for example, a device capable of providing a financial service such as mobile payment. For example, the FinTech device may include a payment device or a point of sales (POS) system.

The weather/environment device may include, for example, a device for monitoring or predicting a weather/environment.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, a 5G (e.g., NR) network, and a beyond-5G network. Although the wireless devices 100a to 100f may communicate with each other through the BSs 200/network 300, the wireless devices 100a to 100f may perform direct communication (e.g., sidelink communication) with each other without passing through the BSs 200/network 300. For example, the vehicles 100b-1 and 100b-2 may perform direct communication (e.g., vehicle-to-vehicle (V2V)/vehicle-to-everything (V2X) communication). The IoT device (e.g., a sensor) may perform direct communication with other IoT devices (e.g., sensors) or other wireless devices 100a to 100f.

Wireless communication/connections 150a, 150b and 150c may be established between the wireless devices 100a to 100f and/or between wireless device 100a to 100f and BS 200 and/or between BSs 200. Herein, the wireless communication/connections may be established through various RATs (e.g., 5G NR) such as uplink/downlink communication 150a, sidelink communication (or device-to-device (D2D) communication) 150b, inter-base station communication 150c (e.g., relay, integrated access and backhaul (IAB)), etc. The wireless devices 100a to 100f and the BSs 200/the wireless devices 100a to 100f may transmit/receive radio signals to/from each other through the wireless communication/connections 150a, 150b and 150c. For example, the wireless communication/connections 150a, 150b and 150c may transmit/receive signals through various physical channels. To this end, at least a part of various configuration information configuring processes, various signal processing processes (e.g., channel encoding/decoding, modulation/demodulation, and resource mapping/de-mapping), and resource allocating processes, for transmitting/receiving radio signals, may be performed based on the various proposals of the present disclosure.

Here, the radio communication technologies implemented in the wireless devices in the present disclosure may include narrowband internet-of-things (NB-IoT) technology for low-power communication as well as LTE, NR and 6G. For example, NB-IoT technology may be an example of low power wide area network (LPWAN) technology, may be implemented in specifications such as LTE Cat NB1 and/or LTE Cat NB2, and may not be limited to the above-mentioned names. Additionally and/or alternatively, the radio communication technologies implemented in the wireless devices in the present disclosure may communicate based on LTE-M technology. For example, LTE-M technology may be an example of LPWAN technology and be called by various names such as enhanced machine type communication (eMTC). For example, LTE-M technology may be implemented in at least one of the various specifications, such as 1) LTE Cat 0, 2) LTE Cat M1, 3) LTE Cat M2, 4) LTE non-bandwidth limited (non-BL), 5) LTE-MTC, 6) LTE Machine Type Communication, and/or 7) LTE M, and may not be limited to the above-mentioned names. Additionally and/or alternatively, the radio communication technologies implemented in the wireless devices in the present disclosure may include at least one of ZigBee, Bluetooth, and/or LPWAN which take into account low-power communication, and may not be limited to the above-mentioned names. For example, ZigBee technology may generate personal area networks (PANs) associated with small/low-power digital communication based on various specifications such as IEEE 802.15.4 and may be called various names.

Figure 2:
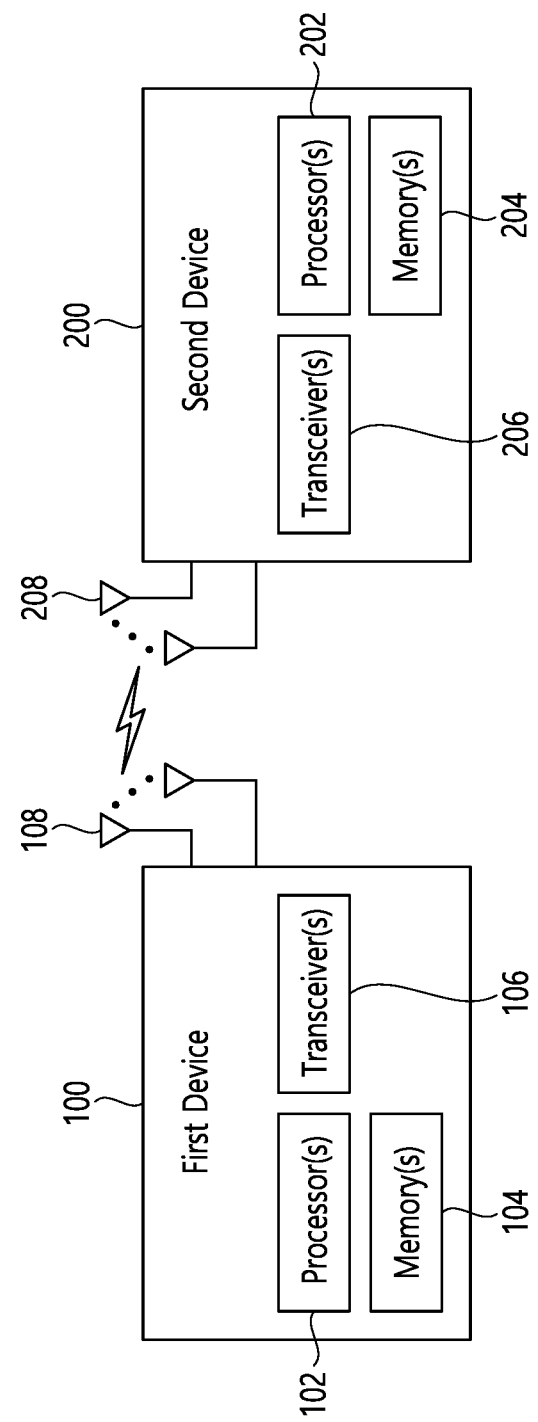
FIG. 2 shows an example of wireless devices to which implementations of the present disclosure is applied.

FIG. 2 shows an example of wireless devices to which implementations of the present disclosure is applied.

Referring to FIG. 2, a first wireless device 100 and a second wireless device 200 may transmit/receive radio signals to/from an external device through a variety of RATs (e.g., LTE and NR). In FIG. 2, {the first wireless device 100 and the second wireless device 200} may correspond to at least one of {the wireless device 100a to 100f and the BS 200}, {the wireless device 100a to 100f and the wireless device 100a to 100f} and/or {the BS 200 and the BS 200} of FIG. 1.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, suggestions, methods and/or operational flowcharts described in the present disclosure. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver(s) 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, suggestions, methods and/or operational flowcharts described in the present disclosure. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with radio frequency (RF) unit(s). In the present disclosure, the first wireless device 100 may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, suggestions, methods and/or operational flowcharts described in the present disclosure. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, suggestions, methods and/or operational flowcharts described in the present disclosure. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the second wireless device 200 may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as physical (PHY) layer, media access control (MAC) layer, radio link control (RLC) layer, packet data convergence protocol (PDCP) layer, radio resource control (RRC) layer, and service data adaptation protocol (SDAP) layer). The one or more processors 102 and 202 may generate one or more protocol data units (PDUs) and/or one or more service data unit (SDUs) according to the descriptions, functions, procedures, suggestions, methods and/or operational flowcharts disclosed in the present disclosure. The one or more processors 102 and 202 may generate messages, control information, data, or information according to the descriptions, functions, procedures, suggestions, methods and/or operational flowcharts disclosed in the present disclosure. The one or more processors 102 and 202 may generate signals (e.g., baseband signals) including PDUs, SDUs, messages, control information, data, or information according to the descriptions, functions, procedures, suggestions, methods and/or operational flowcharts disclosed in the present disclosure and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, suggestions, methods and/or operational flowcharts disclosed in the present disclosure.

The one or more processors 102 and 202 may be referred to as controllers, microcontrollers, microprocessors, or microcomputers. The one or more processors 102 and 202 may be implemented by hardware, firmware, software, or a combination thereof. As an example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. descriptions, functions, procedures, suggestions, methods and/or operational flowcharts disclosed in the present disclosure may be implemented using firmware or software and the firmware or software may be configured to include the modules, procedures, or functions. Firmware or software configured to perform the descriptions, functions, procedures, suggestions, methods and/or operational flowcharts disclosed in the present disclosure may be included in the one or more processors 102 and 202 or stored in the one or more memories 104 and 204 so as to be driven by the one or more processors 102 and 202. The descriptions, functions, procedures, suggestions, methods and/or operational flowcharts disclosed in the present disclosure may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the descriptions, functions, procedures, suggestions, methods and/or operational flowcharts disclosed in the present disclosure, to one or more other devices. The one or more transceivers 106 and 206 may receive user data, control information, and/or radio signals/channels, mentioned in the descriptions, functions, procedures, suggestions, methods and/or operational flowcharts disclosed in the present disclosure, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices.

The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, suggestions, methods and/or operational flowcharts disclosed in the present disclosure, through the one or more antennas 108 and 208. In the present disclosure, the one or more antennas may be a plurality of physical antennas or a plurality of logical antennas (e.g., antenna ports).

The one or more transceivers 106 and 206 may convert received radio signals/channels, etc., from RF band signals into baseband signals in order to process received user data, control information, radio signals/channels, etc., using the one or more processors 102 and 202. The one or more transceivers 106 and 206 may convert the user data, control information, radio signals/channels, etc., processed using the one or more processors 102 and 202 from the base band signals into the RF band signals. To this end, the one or more transceivers 106 and 206 may include (analog) oscillators and/or filters. For example, the transceivers 106 and 206 can up-convert OFDM baseband signals to a carrier frequency by their (analog) oscillators and/or filters under the control of the processors 102 and 202 and transmit the up-converted OFDM signals at the carrier frequency. The transceivers 106 and 206 may receive OFDM signals at a carrier frequency and down-convert the OFDM signals into OFDM baseband signals by their (analog) oscillators and/or filters under the control of the transceivers 102 and 202.

In the implementations of the present disclosure, a UE may operate as a transmitting device in uplink (UL) and as a receiving device in downlink (DL). In the implementations of the present disclosure, a BS may operate as a receiving device in UL and as a transmitting device in DL. Hereinafter, for convenience of description, it is mainly assumed that the first wireless device 100 acts as the UE, and the second wireless device 200 acts as the BS. For example, the processor(s) 102 connected to, mounted on or launched in the first wireless device 100 may be configured to perform the UE behavior according to an implementation of the present disclosure or control the transceiver(s) 106 to perform the UE behavior according to an implementation of the present disclosure. The processor(s) 202 connected to, mounted on or launched in the second wireless device 200 may be configured to perform the BS behavior according to an implementation of the present disclosure or control the transceiver(s) 206 to perform the BS behavior according to an implementation of the present disclosure.

In the present disclosure, a BS is also referred to as a node B (NB), an eNode B (eNB), or a gNB.

Figure 3:
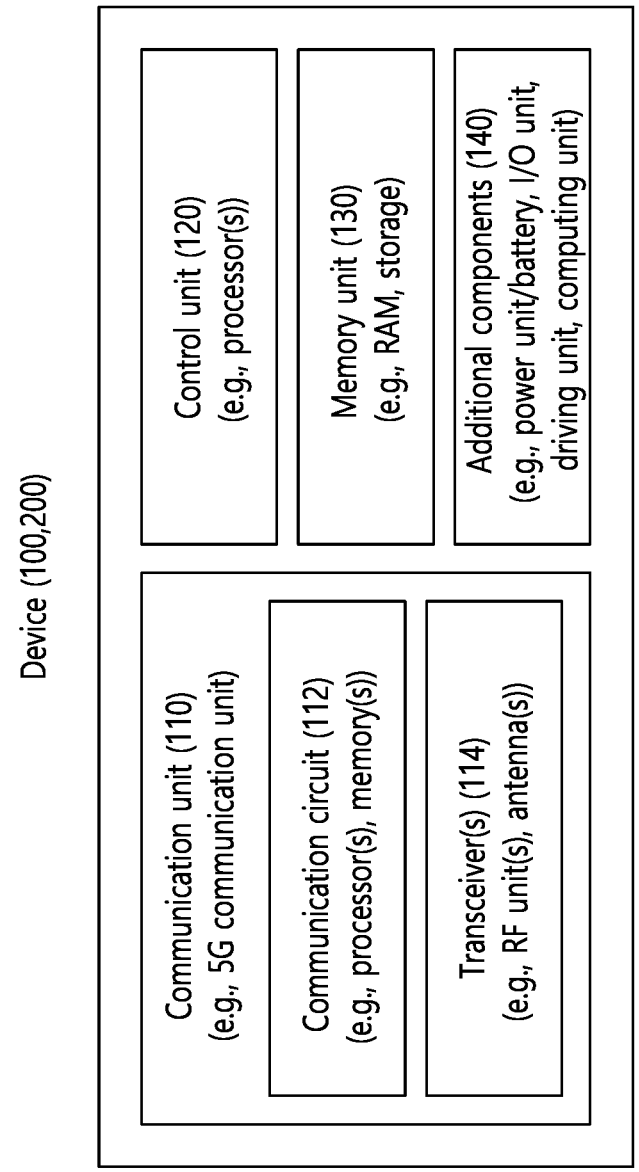
FIG. 3 shows an example of a wireless device to which implementations of the present disclosure is applied.

FIG. 3 shows an example of a wireless device to which implementations of the present disclosure is applied.

The wireless device may be implemented in various forms according to a use-case/service (refer to FIG. 1).

Referring to FIG. 3, wireless devices 100 and 200 may correspond to the wireless devices 100 and 200 of FIG. 2 and may be configured by various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 of FIG. 2 and/or the one or more memories 104 and 204 of FIG. 2. For example, the transceiver(s) 114 may include the one or more transceivers 106 and 206 of FIG. 2 and/or the one or more antennas 108 and 208 of FIG. 2. The control unit 120 is electrically connected to the communication unit 110, the memory 130, and the additional components 140 and controls overall operation of each of the wireless devices 100 and 200. For example, the control unit 120 may control an electric/mechanical operation of each of the wireless devices 100 and 200 based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of the wireless devices 100 and 200. For example, the additional components 140 may include at least one of a power unit/battery, input/output (I/O) unit (e.g., audio I/O port, video I/O port), a driving unit, and a computing unit. The wireless devices 100 and 200 may be implemented in the form of, without being limited to, the robot (100a of FIG. 1), the vehicles (100b-1 and 100b-2 of FIG. 1), the XR device (100c of FIG. 1), the hand-held device (100d of FIG. 1), the home appliance (100e of FIG. 1), the IoT device (100f of FIG. 1), a digital broadcast terminal, a hologram device, a public safety device, an MTC device, a medicine device, a FinTech device (or a finance device), a security device, a climate/environment device, the AI server/device (400 of FIG. 1), the BSs (200 of FIG. 1), a network node, etc. The wireless devices 100 and 200 may be used in a mobile or fixed place according to a use-example/service.

In FIG. 3, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor (AP), an electronic control unit (ECU), a graphical processing unit, and a memory control processor. As another example, the memory 130 may be configured by a RAM, a DRAM, a ROM, a flash memory, a volatile memory, a non-volatile memory, and/or a combination thereof.

Figure 4:
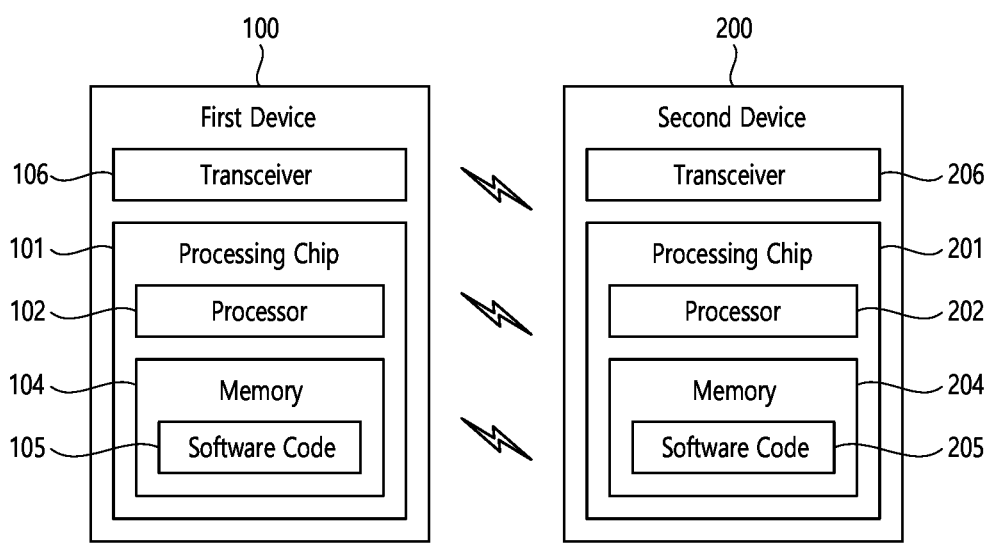
FIG. 4 shows another example of wireless devices to which implementations of the present disclosure is applied.

FIG. 4 shows another example of wireless devices to which implementations of the present disclosure is applied.

Referring to FIG. 4, wireless devices 100 and 200 may correspond to the wireless devices 100 and 200 of FIG. 2 and may be configured by various elements, components, units/portions, and/or modules.

The first wireless device 100 may include at least one transceiver, such as a transceiver 106, and at least one processing chip, such as a processing chip 101. The processing chip 101 may include at least one processor, such a processor 102, and at least one memory, such as a memory 104. The memory 104 may be operably connectable to the processor 102. The memory 104 may store various types of information and/or instructions. The memory 104 may store a software code 105 which implements instructions that, when executed by the processor 102, perform the descriptions, functions, procedures, suggestions, methods and/or operational flowcharts disclosed in the present disclosure. For example, the software code 105 may implement instructions that, when executed by the processor 102, perform the descriptions, functions, procedures, suggestions, methods and/or operational flowcharts disclosed in the present disclosure. For example, the software code 105 may control the processor 102 to perform one or more protocols. For example, the software code 105 may control the processor 102 may perform one or more layers of the radio interface protocol.

The second wireless device 200 may include at least one transceiver, such as a transceiver 206, and at least one processing chip, such as a processing chip 201. The processing chip 201 may include at least one processor, such a processor 202, and at least one memory, such as a memory 204. The memory 204 may be operably connectable to the processor 202. The memory 204 may store various types of information and/or instructions. The memory 204 may store a software code 205 which implements instructions that, when executed by the processor 202, perform the descriptions, functions, procedures, suggestions, methods and/or operational flowcharts disclosed in the present disclosure. For example, the software code 205 may implement instructions that, when executed by the processor 202, perform the descriptions, functions, procedures, suggestions, methods and/or operational flowcharts disclosed in the present disclosure. For example, the software code 205 may control the processor 202 to perform one or more protocols. For example, the software code 205 may control the processor 202 may perform one or more layers of the radio interface protocol.

Figure 5:
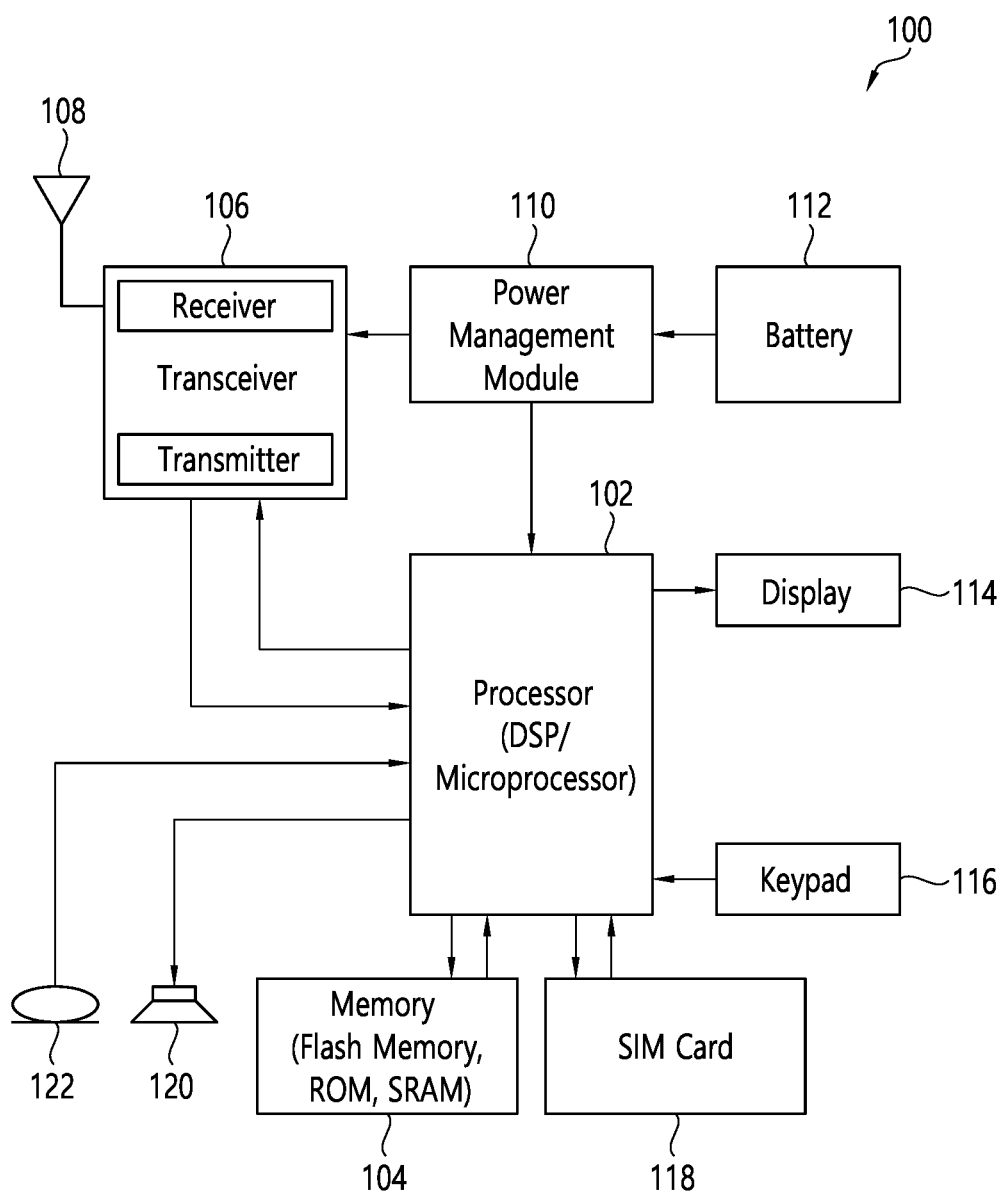
FIG. 5 shows an example of UE to which implementations of the present disclosure is applied.

FIG. 5 shows an example of UE to which implementations of the present disclosure is applied.

Referring to FIG. 5, a UE 100 may correspond to the first wireless device 100 of FIG. 2 and/or the first wireless device 100 of FIG. 4.

A UE 100 includes a processor 102, a memory 104, a transceiver 106, one or more antennas 108, a power management module 110, a battery 1112, a display 114, a keypad 116, a subscriber identification module (SIM) card 118, a speaker 120, and a microphone 122.

The processor 102 may be configured to implement the descriptions, functions, procedures, suggestions, methods and/or operational flowcharts disclosed in the present disclosure. The processor 102 may be configured to control one or more other components of the UE 100 to implement the descriptions, functions, procedures, suggestions, methods and/or operational flowcharts disclosed in the present disclosure. Layers of the radio interface protocol may be implemented in the processor 102. The processor 102 may include ASIC, other chipset, logic circuit and/or data processing device. The processor 102 may be an application processor. The processor 102 may include at least one of a digital signal processor (DSP), a central processing unit (CPU), a graphics processing unit (GPU), a modem (modulator and demodulator). An example of the processor 102 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The memory 104 is operatively coupled with the processor 102 and stores a variety of information to operate the processor 102. The memory 104 may include ROM, RAM, flash memory, memory card, storage medium and/or other storage device. When the embodiments are implemented in software, the techniques described herein can be implemented with modules (e.g., procedures, functions, etc.) that perform the descriptions, functions, procedures, suggestions, methods and/or operational flowcharts disclosed in the present disclosure. The modules can be stored in the memory 104 and executed by the processor 102. The memory 104 can be implemented within the processor 102 or external to the processor 102 in which case those can be communicatively coupled to the processor 102 via various means as is known in the art.

The transceiver 106 is operatively coupled with the processor 102, and transmits and/or receives a radio signal. The transceiver 106 includes a transmitter and a receiver. The transceiver 106 may include baseband circuitry to process radio frequency signals. The transceiver 106 controls the one or more antennas 108 to transmit and/or receive a radio signal.

The power management module 110 manages power for the processor 102 and/or the transceiver 106. The battery 112 supplies power to the power management module 110.

The display 114 outputs results processed by the processor 102. The keypad 116 receives inputs to be used by the processor 102. The keypad 16 may be shown on the display 114.

The SIM card 118 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The speaker 120 outputs sound-related results processed by the processor 102. The microphone 122 receives sound-related inputs to be used by the processor 102.

Figure 6:
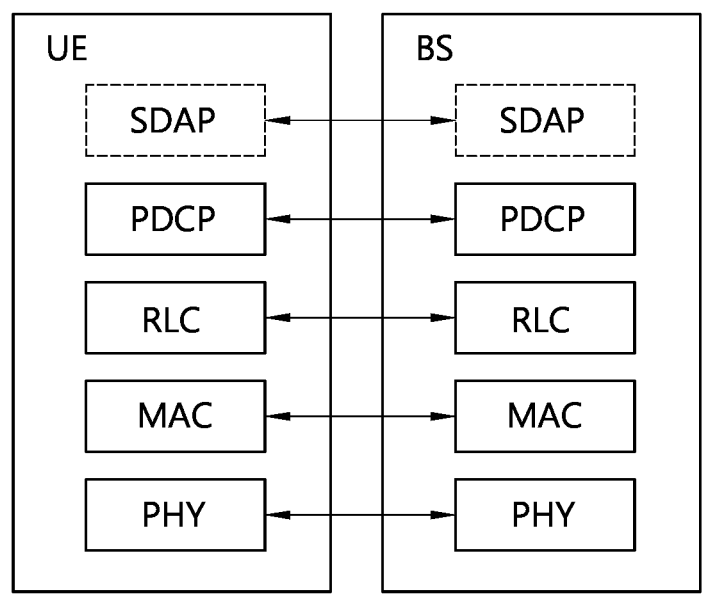
FIGS. 6 and 7 show an example of protocol stacks in a 3GPP based wireless communication system to which implementations of the present disclosure is applied.
Figure 7:
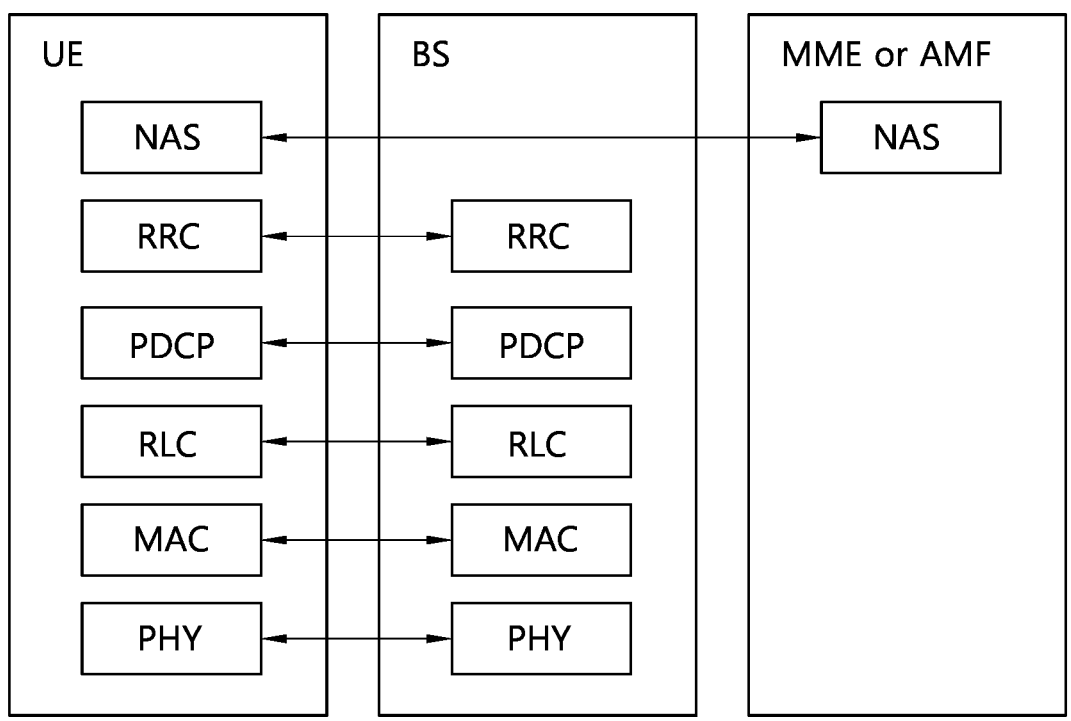

FIGS. 6 and 7 show an example of protocol stacks in a 3GPP based wireless communication system to which implementations of the present disclosure is applied.

In particular, FIG. 6 illustrates an example of a radio interface user plane protocol stack between a UE and a BS and FIG. 7 illustrates an example of a radio interface control plane protocol stack between a UE and a BS. The control plane refers to a path through which control messages used to manage call by a UE and a network are transported. The user plane refers to a path through which data generated in an application layer, for example, voice data or Internet packet data are transported. Referring to FIG. 6, the user plane protocol stack may be divided into Layer 1 (i.e., a PHY layer) and Layer 2. Referring to FIG. 7, the control plane protocol stack may be divided into Layer 1 (i.e., a PHY layer), Layer 2, Layer 3 (e.g., an RRC layer), and a non-access stratum (NAS) layer. Layer 1, Layer 2 and Layer 3 are referred to as an access stratum (AS).

In the 3GPP LTE system, the Layer 2 is split into the following sublayers: MAC, RLC, and PDCP. In the 3GPP NR system, the Layer 2 is split into the following sublayers: MAC, RLC, PDCP and SDAP. The PHY layer offers to the MAC sublayer transport channels, the MAC sublayer offers to the RLC sublayer logical channels, the RLC sublayer offers to the PDCP sublayer RLC channels, the PDCP sublayer offers to the SDAP sublayer radio bearers. The SDAP sublayer offers to 5G core network quality of service (QoS) flows.

In the 3GPP NR system, the main services and functions of the MAC sublayer include: mapping between logical channels and transport channels; multiplexing/de-multiplexing of MAC SDUs belonging to one or different logical channels into/from transport blocks (TB) delivered to/from the physical layer on transport channels; scheduling information reporting; error correction through hybrid automatic repeat request (HARQ) (one HARQ entity per cell in case of carrier aggregation (CA)); priority handling between UEs by means of dynamic scheduling; priority handling between logical channels of one UE by means of logical channel prioritization; padding. A single MAC entity may support multiple numerologies, transmission timings and cells. Mapping restrictions in logical channel prioritization control which numerology(ies), cell(s), and transmission timing(s) a logical channel can use.

Different kinds of data transfer services are offered by MAC. To accommodate different kinds of data transfer services, multiple types of logical channels are defined, i.e., each supporting transfer of a particular type of information. Each logical channel type is defined by what type of information is transferred. Logical channels are classified into two groups: control channels and traffic channels. Control channels are used for the transfer of control plane information only, and traffic channels are used for the transfer of user plane information only. Broadcast control channel (BCCH) is a downlink logical channel for broadcasting system control information, paging control channel (PCCH) is a downlink logical channel that transfers paging information, system information change notifications and indications of ongoing public warning service (PWS) broadcasts, common control channel (CCCH) is a logical channel for transmitting control information between UEs and network and used for UEs having no RRC connection with the network, and dedicated control channel (DCCH) is a point-to-point bi-directional logical channel that transmits dedicated control information between a UE and the network and used by UEs having an RRC connection. Dedicated traffic channel (DTCH) is a point-to-point logical channel, dedicated to one UE, for the transfer of user information. A DTCH can exist in both uplink and downlink. In downlink, the following connections between logical channels and transport channels exist: BCCH can be mapped to broadcast channel (BCH); BCCH can be mapped to downlink shared channel (DL-SCH); PCCH can be mapped to paging channel (PCH); CCCH can be mapped to DL-SCH; DCCH can be mapped to DL-SCH; and DTCH can be mapped to DL-SCH. In uplink, the following connections between logical channels and transport channels exist: CCCH can be mapped to uplink shared channel (UL-SCH); DCCH can be mapped to UL-SCH; and DTCH can be mapped to UL-SCH.

The RLC sublayer supports three transmission modes: transparent mode (TM), unacknowledged mode (UM), and acknowledged node (AM). The RLC configuration is per logical channel with no dependency on numerologies and/or transmission durations. In the 3GPP NR system, the main services and functions of the RLC sublayer depend on the transmission mode and include: transfer of upper layer PDUs; sequence numbering independent of the one in PDCP (UM and AM); error correction through ARQ (AM only); segmentation (AM and UM) and re-segmentation (AM only) of RLC SDUs; reassembly of SDU (AM and UM); duplicate detection (AM only); RLC SDU discard (AM and UM); RLC re-establishment; protocol error detection (AM only).

In the 3GPP NR system, the main services and functions of the PDCP sublayer for the user plane include: sequence numbering; header compression and decompression using robust header compression (ROHC); transfer of user data; reordering and duplicate detection; in-order delivery; PDCP PDU routing (in case of split bearers); retransmission of PDCP SDUs; ciphering, deciphering and integrity protection; PDCP SDU discard; PDCP re-establishment and data recovery for RLC AM; PDCP status reporting for RLC AM; duplication of PDCP PDUs and duplicate discard indication to lower layers. The main services and functions of the PDCP sublayer for the control plane include: sequence numbering; ciphering, deciphering and integrity protection; transfer of control plane data; reordering and duplicate detection; in-order delivery; duplication of PDCP PDUs and duplicate discard indication to lower layers.

In the 3GPP NR system, the main services and functions of SDAP include: mapping between a QoS flow and a data radio bearer; marking QoS flow ID (QFI) in both DL and UL packets. A single protocol entity of SDAP is configured for each individual PDU session.

In the 3GPP NR system, the main services and functions of the RRC sublayer include: broadcast of system information related to AS and NAS; paging initiated by 5 GC or NG-RAN; establishment, maintenance and release of an RRC connection between the UE and NG-RAN; security functions including key management; establishment, configuration, maintenance and release of signaling radio bearers (SRBs) and data radio bearers (DRBs); mobility functions (including: handover and context transfer, UE cell selection and reselection and control of cell selection and reselection, inter-RAT mobility); QoS management functions; UE measurement reporting and control of the reporting; detection of and recovery from radio link failure; NAS message transfer to/from NAS from/to UE.

Figure 8:
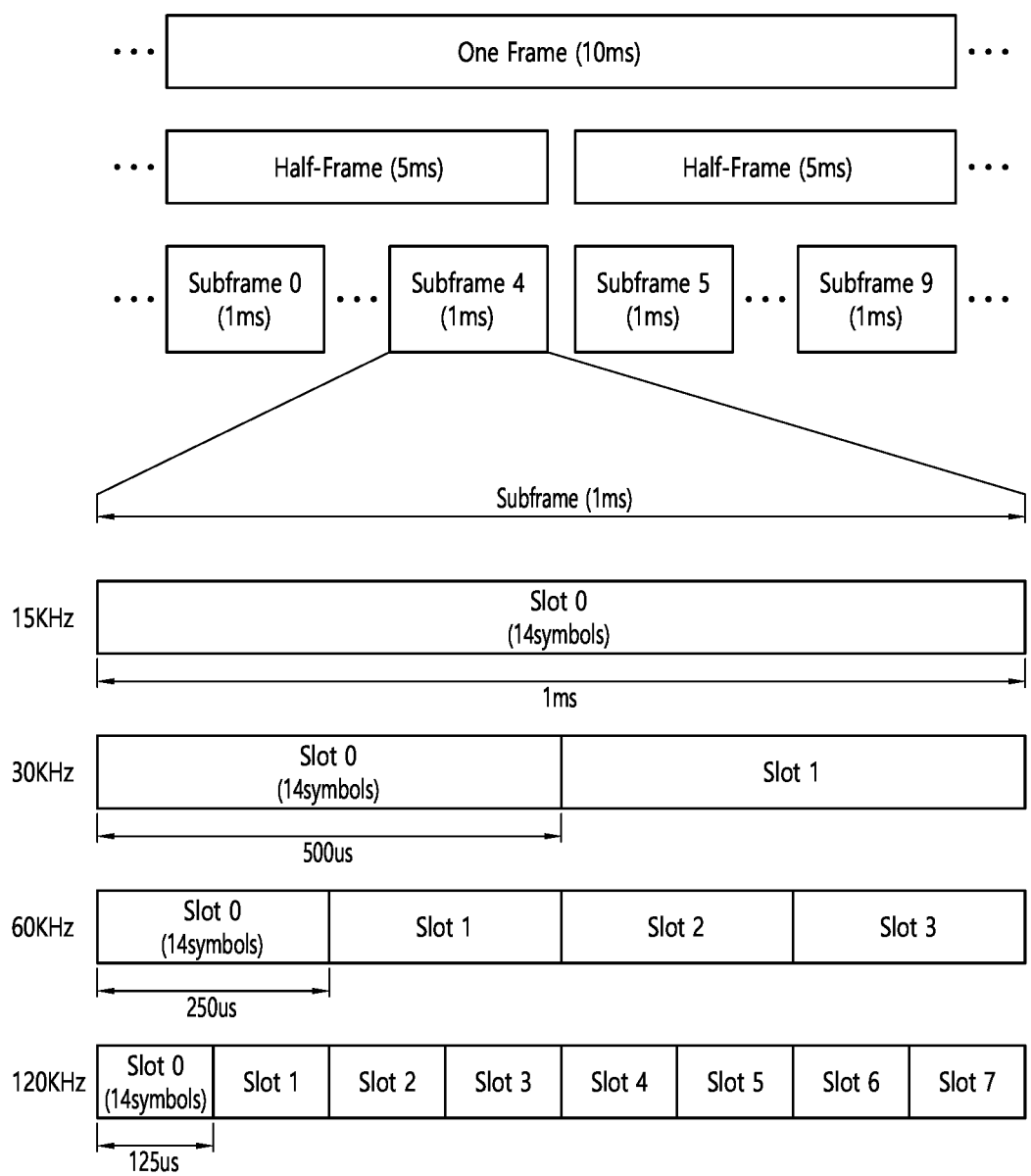
FIG. 8 shows a frame structure in a 3GPP based wireless communication system to which implementations of the present disclosure is applied.

FIG. 8 shows a frame structure in a 3GPP based wireless communication system to which implementations of the present disclosure is applied.

The frame structure shown in FIG. 8 is purely exemplary and the number of subframes, the number of slots, and/or the number of symbols in a frame may be variously changed. In the 3GPP based wireless communication system, OFDM numerologies (e.g., subcarrier spacing (SCS), transmission time interval (TTI) duration) may be differently configured between a plurality of cells aggregated for one UE. For example, if a UE is configured with different SCSs for cells aggregated for the cell, an (absolute time) duration of a time resource (e.g., a subframe, a slot, or a TTI) including the same number of symbols may be different among the aggregated cells. Herein, symbols may include OFDM symbols (or CP-OFDM symbols), SC-FDMA symbols (or discrete Fourier transform-spread-OFDM (DFT-s-OFDM) symbols).

Referring to FIG. 8, downlink and uplink transmissions are organized into frames. Each frame has $T_f=10$ ms duration. Each frame is divided into two half-frames, where each of the half-frames has 5 ms duration. Each half-frame consists of 5 subframes, where the duration $T_{sf}$ per subframe is 1 ms. Each subframe is divided into slots and the number of slots in a subframe depends on a subcarrier spacing. Each slot includes 14 or 12 OFDM symbols based on a cyclic prefix (CP). In a normal CP, each slot includes 14 OFDM symbols and, in an extended CP, each slot includes 12 OFDM symbols. The numerology is based on exponentially scalable subcarrier spacing $\Delta f=2^u*15$ kHz.

Table 1 shows the number of OFDM symbols per slot $N^{slot}_{symb}$, the number of slots per frame $N^{frame,u}_{slot}$, and the number of slots per subframe $N^{subframe,u}_{slot}$ for the normal CP, according to the subcarrier spacing $\Delta f=2^u*15$ kHz.

TABLE 1

| u | $N^{slot}_{symb}$ | $N^{frame,u}_{slot}$ | $N^{subframe,u}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

Table 2 shows the number of OFDM symbols per slot $N^{slot}_{symb}$, the number of slots per frame $N^{frame,u}_{slot}$, and the number of slots per subframe $N^{subframe,u}_{slot}$ for the extended CP, according to the subcarrier spacing $\Delta f=2^u*15$ kHz.

TABLE 2

| u | $N^{slot}_{symb}$ | $N^{frame,u}_{slot}$ | $N^{subframe,u}_{slot}$ |
|---|---|---|---|
| 2 | 12 | 40 | 4 |

A slot includes plural symbols (e.g., 14 or 12 symbols) in the time domain. For each numerology (e.g., subcarrier spacing) and carrier, a resource grid of $N^{size,u}_{grid,x}*N^{RB}_{sc}$ subcarriers and $N^{subframe,u}_{symb}$ OFDM symbols is defined, starting at common resource block (CRB) $N^{start,u}_{symb}$ indicated by higher-layer signaling (e.g., RRC signaling), where $N^{size,u}_{grid,x}$ is the number of resource blocks (RBs) in the resource grid and the subscript x is DL for downlink and UL for uplink. $N^{RB}_{sc}$ is the number of subcarriers per RB. In the 3GPP based wireless communication system, $N^{RB}_{sc}$ is 12 generally. There is one resource grid for a given antenna port p, subcarrier spacing configuration u, and transmission direction (DL or UL). The carrier bandwidth $N^{size,u}_{grid}$ for subcarrier spacing configuration u is given by the higher-layer parameter (e.g., RRC parameter). Each element in the resource grid for the antenna port p and the subcarrier spacing configuration u is referred to as a resource element (RE) and one complex symbol may be mapped to each RE. Each RE in the resource grid is uniquely identified by an index k in the frequency domain and an index l representing a symbol location relative to a reference point in the time domain. In the 3GPP based wireless communication system, an RB is defined by 12 consecutive subcarriers in the frequency domain. In the 3GPP NR system, RBs are classified into CRBs and physical resource blocks (PRBs). CRBs are numbered from 0 and upwards in the frequency domain for subcarrier spacing configuration u. The center of subcarrier 0 of CRB 0 for subcarrier spacing configuration u coincides with 'point A' which serves as a common reference point for resource block grids. In the 3GPP NR system, PRBs are defined within a bandwidth part (BWP) and numbered from 0 to $N^{size}_{BWP,i}-1$, where i is the number of the bandwidth part. The relation between the physical resource block $n_{PRB}$ in the bandwidth part i and the common resource block $n_{CRB}$ is as follows: $n_{PRB}=n_{CRB}+N^{size}_{BWP,i}$, where $N^{size}_{BWP,i}$ is the common resource block where bandwidth part starts relative to CRB 0. The BWP includes a plurality of consecutive RBs. A carrier may include a maximum of N (e.g., 5) BWPs. A UE may be configured with one or more BWPs on a given component carrier. Only one BWP among BWPs configured to the UE can active at a time. The active BWP defines the UE's operating bandwidth within the cell's operating bandwidth.

The NR frequency band may be defined as two types of frequency range, i.e., FR1 and FR2. The numerical value of the frequency range may be changed. For example, the frequency ranges of the two types (FR1 and FR2) may be as shown in Table 3 below. For ease of explanation, in the frequency ranges used in the NR system, FR1 may mean "sub 6 GHz range", FR2 may mean "above 6 GHz range," and may be referred to as millimeter wave (mmW).

TABLE 3

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As mentioned above, the numerical value of the frequency range of the NR system may be changed. For example, FR1 may include a frequency band of 410 MHz to 7125 MHz as shown in Table 4 below. That is, FR1 may include a frequency band of 6 GHz (or 5850, 5900, 5925 MHz, etc.) or more. For example, a frequency band of 6 GHz (or 5850, 5900, 5925 MHz, etc.) or more included in FR1 may include an unlicensed band. Unlicensed bands may be used for a variety of purposes, for example for communication for vehicles (e.g., autonomous driving).

TABLE 4

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

In the present disclosure, the term "cell" may refer to a geographic area to which one or more nodes provide a communication system, or refer to radio resources. A "cell" as a geographic area may be understood as coverage within which a node can provide service using a carrier and a "cell" as radio resources (e.g., time-frequency resources) is associated with bandwidth which is a frequency range configured by the carrier. The "cell" associated with the radio resources is defined by a combination of downlink resources and uplink resources, for example, a combination of a DL component carrier (CC) and a UL CC. The cell may be configured by downlink resources only, or may be configured by downlink resources and uplink resources. Since DL coverage, which is a range within which the node is capable of transmitting a valid signal, and UL coverage, which is a range within which the node is capable of receiving the valid signal from the UE, depends upon a carrier carrying the signal, the coverage of the node may be associated with coverage of the "cell" of radio resources used by the node. Accordingly, the term "cell" may be used to represent service coverage of the node sometimes, radio resources at other times, or a range that signals using the radio resources can reach with valid strength at other times. In CA, two or more CCs are aggregated. A UE may simultaneously receive or transmit on one or multiple CCs depending on its capabilities. CA is supported for both contiguous and non-contiguous CCs. When CA is configured, the UE only has one RRC connection with the network. At RRC connection establishment/re-establishment/handover, one serving cell provides the NAS mobility information, and at RRC connection re-establishment/handover, one serving cell provides the security input. This cell is referred to as the primary cell (PCell). The PCell is a cell, operating on the primary frequency, in which the UE either performs the initial connection establishment procedure or initiates the connection re-establishment procedure. Depending on UE capabilities, secondary cells (SCells) can be configured to form together with the PCell a set of serving cells. An SCell is a cell providing additional radio resources on top of special cell (SpCell). The configured set of serving cells for a UE therefore always consists of one PCell and one or more SCells. For dual connectivity (DC) operation, the term SpCell refers to the PCell of the master cell group (MCG) or the primary SCell (PSCell) of the secondary cell group (SCG). An SpCell supports PUCCH transmission and contention-based random access, and is always activated. The MCG is a group of serving cells associated with a master node, comprised of the SpCell (PCell) and optionally one or more SCells. The SCG is the subset of serving cells associated with a secondary node, comprised of the PSCell and zero or more SCells, for a UE configured with DC. For a UE in RRC_CONNECTED not configured with CA/DC, there is only one serving cell comprised of the PCell. For a UE in RRC_CONNECTED configured with CA/DC, the term "serving cells" is used to denote the set of cells comprised of the SpCell(s) and all SCells. In DC, two MAC entities are configured in a UE: one for the MCG and one for the SCG.

Figure 9:
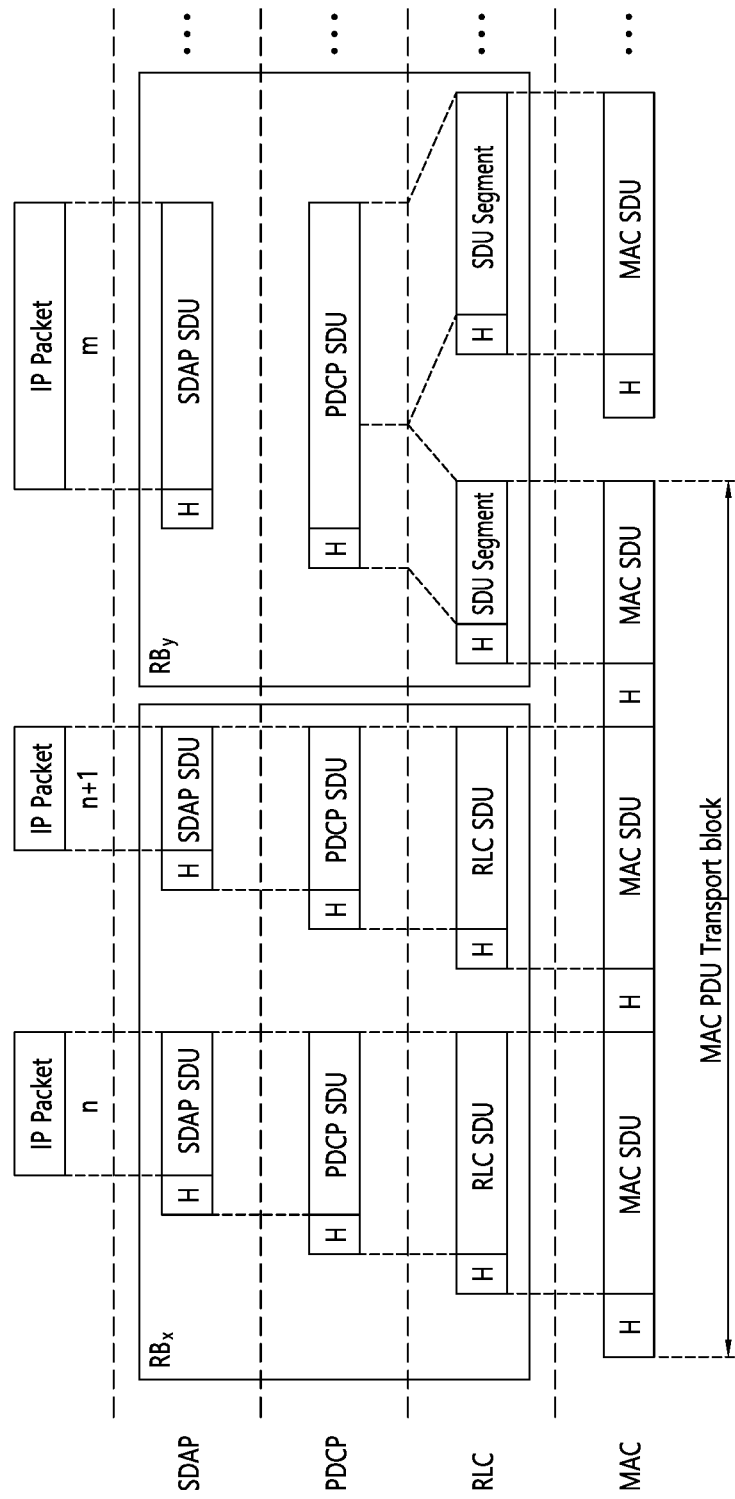
FIG. 9 shows a data flow example in the 3GPP NR system to which implementations of the present disclosure is applied.

FIG. 9 shows a data flow example in the 3GPP NR system to which implementations of the present disclosure is applied.

Referring to FIG. 9, "RB" denotes a radio bearer, and "H" denotes a header. Radio bearers are categorized into two groups: DRBs for user plane data and SRBs for control plane data. The MAC PDU is transmitted/received using radio resources through the PHY layer to/from an external device. The MAC PDU arrives to the PHY layer in the form of a transport block.

In the PHY layer, the uplink transport channels UL-SCH and RACH are mapped to their physical channels PUSCH and PRACH, respectively, and the downlink transport channels DL-SCH, BCH and PCH are mapped to PDSCH, PBCH and PDSCH, respectively. In the PHY layer, uplink control information (UCI) is mapped to PUCCH, and downlink control information (DCI) is mapped to PDCCH. A MAC PDU related to UL-SCH is transmitted by a UE via a PUSCH based on an UL grant, and a MAC PDU related to DL-SCH is transmitted by a BS via a PDSCH based on a DL assignment.

Support for vehicle-to-vehicle (V2V) and vehicle-to-everything (V2X) services has been introduced in LTE during Releases 14 and 15, in order to expand the 3GPP platform to the automotive industry. These work items defined an LTE sidelink suitable for vehicular applications, and complementary enhancements to the cellular infrastructure.

Further to this work, requirements for support of enhanced V2X use cases have been defined in 5G LTE/NR, which are broadly arranged into four use case groups:
1) Vehicles platooning enables the vehicles to dynamically form a platoon travelling together. All the vehicles in the platoon obtain information from the leading vehicle to manage this platoon. These information allow the vehicles to drive closer than normal in a coordinated manner, going to the same direction and travelling together.
2) Extended Sensors enables the exchange of raw or processed data gathered through local sensors or live video images among vehicles, road site units, devices of pedestrian and V2X application servers. The vehicles can increase the perception of their environment beyond of what their own sensors can detect and have a more broad and holistic view of the local situation. High data rate is one of the key characteristics.

3) Advanced driving enables semi-automated or full-automated driving. Each vehicle and/or RSU shares its own perception data obtained from its local sensors with vehicles in proximity and that allows vehicles to synchronize and coordinate their trajectories or maneuvers. Each vehicle shares its driving intention with vehicles in proximity too.

4) Remote driving enables a remote driver or a V2X application to operate a remote vehicle for those passengers who cannot drive by themselves or remote vehicles located in dangerous environments. For a case where variation is limited and routes are predictable, such as public transportation, driving based on cloud computing can be used. High reliability and low latency are the main requirements.

NR sidelink (SL) unicast, groupcast, and broadcast design is described. SL broadcast, groupcast, and unicast transmissions are supported for the in-coverage, out-of-coverage and partial-coverage scenarios.

Figure 10:
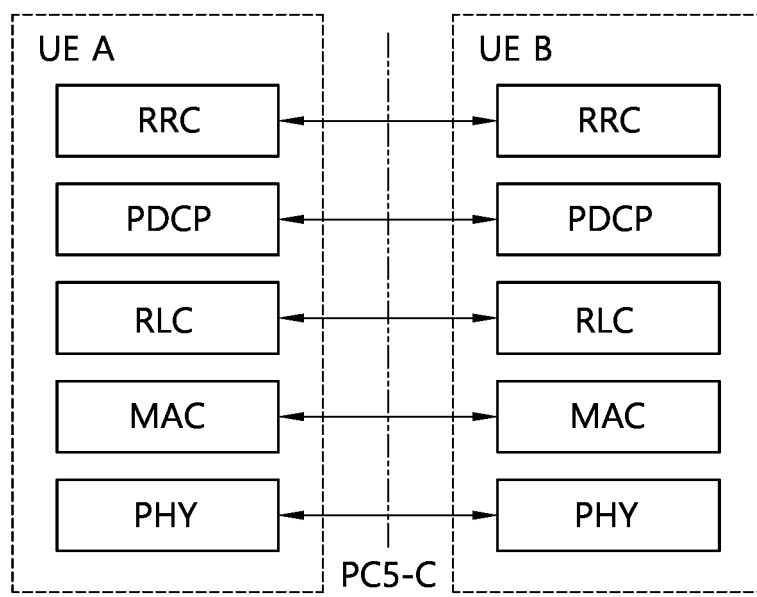
FIGS. 10 and 11 show an example of PC5 protocol stacks to which implementations of the present disclosure is applied.
Figure 11:
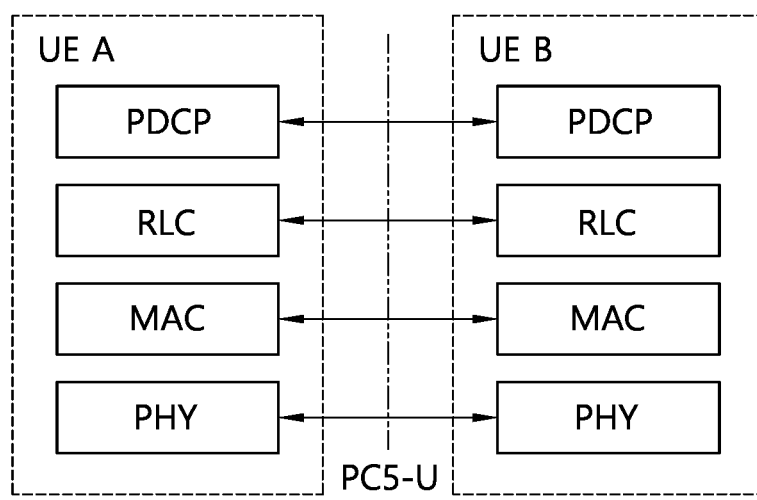

FIGS. 10 and 11 show an example of PC5 protocol stacks to which implementations of the present disclosure is applied.

FIG. 10 illustrates an example of a PC5 control plane (PC5-C) protocol stack between UEs. The AS protocol stack for the control plane in the PC5 interface consists of at least RRC, PDCP, RLC and MAC sublayers, and the physical layer.

FIG. 11 illustrates an example of a PC5 user plane (PC5-U) protocol stack between UEs. The AS protocol stack for user plane in the PC5 interface consists of at least PDCP, RLC and MAC sublayers, and the physical layer.

For the purposes of physical layer analysis, it is assumed that higher layers decide if unicast, groupcast, or broadcast transmission is to be used for a particular data transfer, and they correspondingly inform the physical layer. When considering a unicast or groupcast transmission, it is assumed that the UE is able to establish which unicast or groupcast session a transmission belongs to, and that the following identities is known to the physical layer:

The layer-1 destination ID, conveyed via physical sidelink control channel (PSCCH)

Additional layer-1 ID(s), conveyed via PSCCH, at least for the purpose of identifying which transmissions can be combined in reception when HARQ feedback is in use HARQ process ID For the purpose of Layer 2 analysis, it is assumed that upper layers (i.e., above AS) provide the information on whether it is a unicast, groupcast or broadcast transmission for a particular data transfer. For the unicast and groupcast transmission in SL, the following identities is known to Layer 2:

Unicast: destination ID, source ID

Groupcast: destination group ID, source ID

Discovery procedure and related messages for the unicast and groupcast transmission are up to upper layers.

At least the following two SL resource allocation modes are defined as follows.

(1) Mode 1: BS schedules SL resource(s) to be used by UE for SL transmission(s).

(2) Mode 2: UE determines, i.e., BS does not schedule, SL transmission resource(s) within SL resources configured by BS/network or pre-configured SL resources.

The definition of SL resource allocation Mode 2 covers:
  a) UE autonomously selects SL resource for transmission
  b) UE assists SL resource selection for other UE(s)
  c) UE is configured with NR configured grant (Type-1 like) for SL transmission
  d) UE schedules SL transmissions of other UEs For SL resource allocation Mode 2, sensing and resource (re-)selection-related procedures may be considered. The sensing procedure considered is defined as decoding sidelink control information (SCI) from other UEs and/or SL measurements. The resource (re-)selection procedure considered uses the results of the sensing procedure to determine resource(s) for SL transmission.

For Mode 2(a), SL sensing and resource selection procedures may be considered in the context of a semi-persistent scheme where resource(s) are selected for multiple transmissions of different TBs and a dynamic scheme where resource(s) are selected for each TB transmission.

The following techniques may be considered to identify occupied SL resources:

Decoding of SL control channel transmissions

SL measurements

Detection of SL transmissions

The following aspects may be considered for SL resource selection:

How a UE selects resource for PSCCH and physical sidelink shared channel (PSSCH) transmission (and other SL physical channel/signals that are defined)

Which information is used by UE for resource selection procedure

Mode 2(b) is a functionality that can be part of Mode 2(a), (c), (d) operation.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A pattern is defined by the size and position(s) of the resource in time and frequency, and the number of resources. For Mode 2(d), the procedures to become or serve as a scheduling UE for in-coverage and out-of-coverage scenarios may be considered as follows:

Scheduling UE is configured by gNB

Application layer or pre-configuration selects scheduling UE

Receiver UE schedules transmissions of the transmitter UE during the session

Scheduling UE is decided by multiple UEs including the one that is finally selected. The UE may autonomously decide to serve as a scheduling UE/offer scheduling UE functions (i.e., by self-nomination).

Until Rel-15, broadcast transmission is supported only for V2X communication. Broadcast transmission means that V2X transmission by one wireless device is broadcast to several unspecified wireless devices. In case of NR V2X, unicast and groupcast transmission may also be supported for V2X communication as well as broadcast transmission. Unicast transmission means that V2X transmission by one wireless device is transmitted to one specified other wireless device. Groupcast transmission means that V2X transmission by one wireless device is transmitted to several specified other wireless devices which belongs to a group. Unicast transmission is expected to be used for high reliability and low latency cases, e.g., extended sensor sharing and remote driving, emergency, etc.

In NR V2X, one wireless device may establish a PC5 link (e.g., one-to-one connection and/or session between wireless devices) for unicast service with another wireless device. PC5 Signaling protocol above RRC layer in the wireless devices may be used for unicast link establishment and management. Based on the unicast link establishment and management, the wireless devices may exchange PC5 signaling (i.e., upper layer signaling than RRC signaling) to successfully or unsuccessfully establish a unicast link with security activation or release the established unicast link.

Hereinafter, QoS handling for V2X communication over PC5 reference point is described. It may be referred to as Section 5.4.1 of 3GPP TS 23.287 V16.0.0.

For LTE based PC5, the QoS handling is defined based on ProSe Per-Packet Priority (PPPP) and ProSe Per-Packet Reliability (PPPR).

For NR based PC5, a QoS model similar to that defined for Uu reference point is used, i.e. based on 5QIs, with additional parameter of Range. For the V2X communication over NR based PC5 reference point, a PC5 QoS Flow is associated with a PC5 QoS Rule that contains the PC5 QoS parameters. A set of standardized PC5 5QIs (PQI) are defined. The UE may be configured with a set of default PC5 QoS parameters to use for the V2X services. For NR based unicast, groupcast and broadcast PC5 communication, Per-flow QoS model for PC5 QoS management shall be applied.

Figure 12:
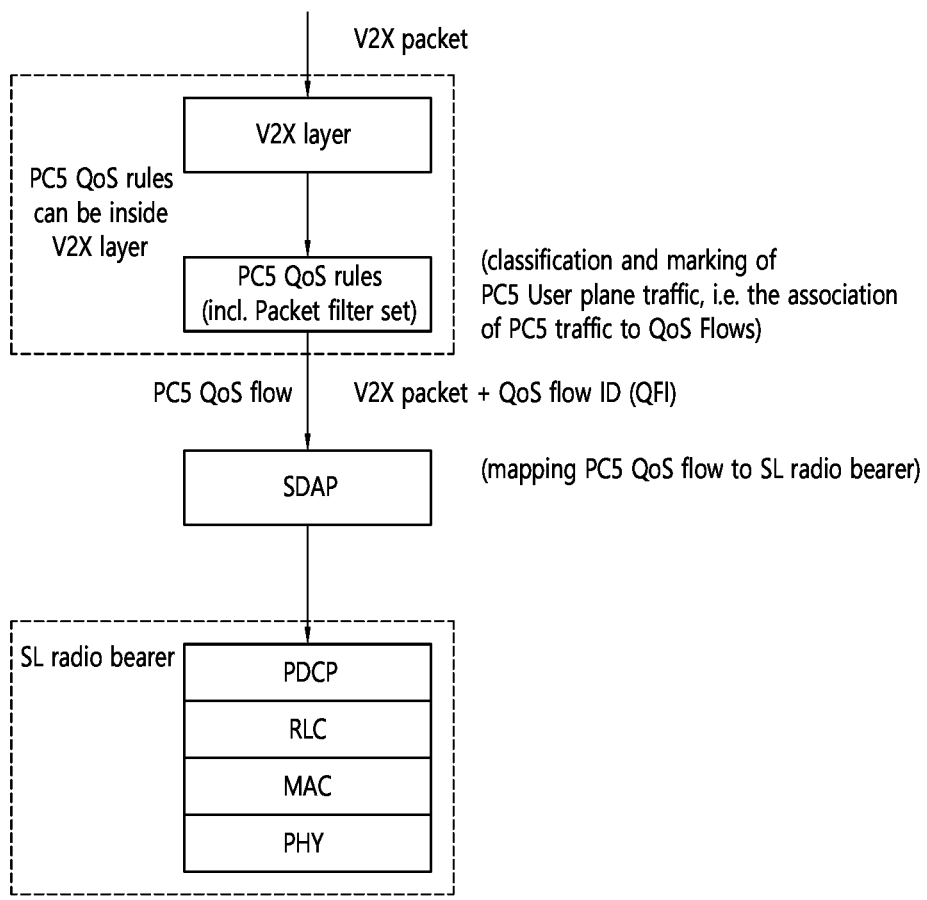
FIG. 12 shows an example mapping of Per-flow QoS model for NR PC5 to which implementations of the present disclosure is applied.

FIG. 12 shows an example mapping of Per-flow QoS model for NR PC5 to which implementations of the present disclosure is applied.

The V2X packet in a Per-flow QoS model may be transmitted to V2X layer and PC5 QoS rules from the upper layer. For example, PC5 QoS rules can be inside V2X layer. For example, PC5 QoS rules may include Packet filter set. For example, the V2X layer may perform classification and marking of PC5 User plane traffic. For example, the V2X layer may mark the association of PC5 traffic to QoS Flows.

The V2X layer may transmit the V2X packet based on the PC5 QoS flow. For example, the V2X layer may add a QoS flow ID (QFI) to the V2X packet.

The V2X packet with the QFI may transmitted to the SDAP layer. The SDAP layer may map PC5 QoS flow to the SL radio Bearer.

The V2X packet may be transmitted to the mapped SL radio bearer. The SL radio bearer may be configured via at least one of PDCP layer, RLC layer, MAC layer, and PHY layer.

The following principles apply when the V2X communication is carried over PC5 reference point:

Application layer may set the V2X Application Requirements for the V2X communication, using either PPPP and PPPR model or the PQI and Range model. Depends on the type of PC5 reference point, i.e. LTE based or NR based, selected for the transmission, the UE may map the application layer provided V2X Application Requirements to the suitable QoS parameters to be passed to the lower layer. The mapping between the two QoS models is defined. For V2X communication over NR based PC5, different V2X packets may require different QoS treatments. In that case, the V2X packets shall be sent from the V2X layer to the Access Stratum layer within PC5 QoS Flows identified by different PFIs.

When groupcast mode of V2X communication over NR based PC5 is used, a Range parameter is associated with the QoS parameters for the V2X communication. The Range may be provided by V2X application layer or use a default value mapped from the service type based on configuration. The Range indicates the minimum distance that the QoS parameters need to be fulfilled. The Range parameter is passed to AS layer together with the QoS parameters for dynamic control.

NR based PC5 supports three types of communication mode, i.e. broadcast, groupcast, and unicast.

The UE may handle broadcast, groupcast, and unicast traffic by taking all their priorities, e.g. indicated by PQIs, into account.

For broadcast and groupcast modes of V2X communication over NR based PC5, standardized PQI values are applied by the UE, as there is no signalling over PC5 reference point for these cases.

When network scheduled operation mode is used, the UE-PC5-AMBR for NR based PC5 applies to all types of communication modes, and is used by NG-RAN for capping the UE's NR based PC5 transmission in the resources management.

Deriving PC5 QoS parameters and assigning PFI for PC5 QoS Flow is described.

The following description applies to for both network scheduled operation mode and UE autonomous resources selection mode.

When service data or request from the V2X application layer is received, the UE determines if there is any existing PC5 QoS Flow matching the service data or request, i.e. based on the PC5 QoS Rules for the existing PC5 QoS Flow(s).

If there is no PC5 QoS Flow matching the service data or request, the UE derives PC5 QoS parameters based on the V2X Application Requirements provided by the V2X application layer (if available) and the V2X service type (e.g. PSID or ITS-AID) according to the PC5 QoS mapping configuration. The UE creates a new PC5 QoS Flow for the derived PC5 QoS parameters.

The UE then assigns a PFI and derives PC5 QoS Rule for this PC5 QoS Flow.

For V2X communication over NR PC5 reference point, the PC5 QoS Flow is the finest granularity of QoS differentiation in the same destination identified by Destination Layer-2 ID. User Plane traffic with the same PFI receives the same traffic forwarding treatment (e.g. scheduling, admission threshold). The PFI is unique within a same destination.

It is FFS whether to handle same PC5 QoS parameters with same destination L2 ID for a V2X service using different communication modes (e.g. broadcast, groupcast, unicast) as separate PC5 QoS Flows.

Handling of PC5 QoS Flows based on PC5 QoS Rules is described.

For each communication mode (e.g. broadcast, groupcast, unicast), the UE maintains the mappings of PFIs to the PC5 QoS Context and PC5 QoS Rules per destination identified by Destination Layer-2 ID. A PC5 QoS Context includes PC5 QoS parameters (e.g. PQI and Range) and the V2X service type (e.g. PSID or ITS-AID). When the UE assigns a new PFI for V2X service, the UE stores it with the corresponding PC5 QoS Context and PC5 QoS Rules for the destination. When the UE releases the PFI, the UE removes the corresponding PC5 QoS Context and PC5 QoS Rules for the destination. For unicast, the Unicast Link Profile contains addition information mapped from PFI for unicast operation.

The PC5 QoS Rule contains the PFI of the associated PC5 QoS Flow, a precedence value, and a PC5 Packet Filter Set. The precedence value determines the order in which the PC5

QoS Rules are evaluated. The PC5 QoS Rule with lower precedence value is evaluated before those with the higher precedence values.

The V2X layer provides information for PC5 QoS operations per destination (e.g. identified by Destination Layer-2 ID) to AS layer for Per-flow QoS model operations as below:
1) To add a new PC5 QoS Flow or to modify any existing PC5 QoS Flow, the V2X layer provides the PFI, the corresponding PC5 QoS parameters and source/destination Layer-2 IDs for the PC5 QoS Flow to AS layer.
2) To remove any existing PC5 QoS Flow, the V2X layer provides the PFI and source/destination Layer-2 IDs for the PC5 QoS Flow to AS layer.

For example, 1) and 2) apply to broadcast and groupcast.

In addition, the V2X layer also provides the communication mode (e.g. broadcast, groupcast, unicast), radio frequencies, Tx Profile to the AS layer for the PC5 operation. The radio frequencies and Tx Profile are determined based on the V2X service type. The V2X layer ensures that V2X services (e.g. identified by PSID or ITS-AID) associated with different radio frequencies are classified into distinct PC5 QoS Flows.

Figure 13:
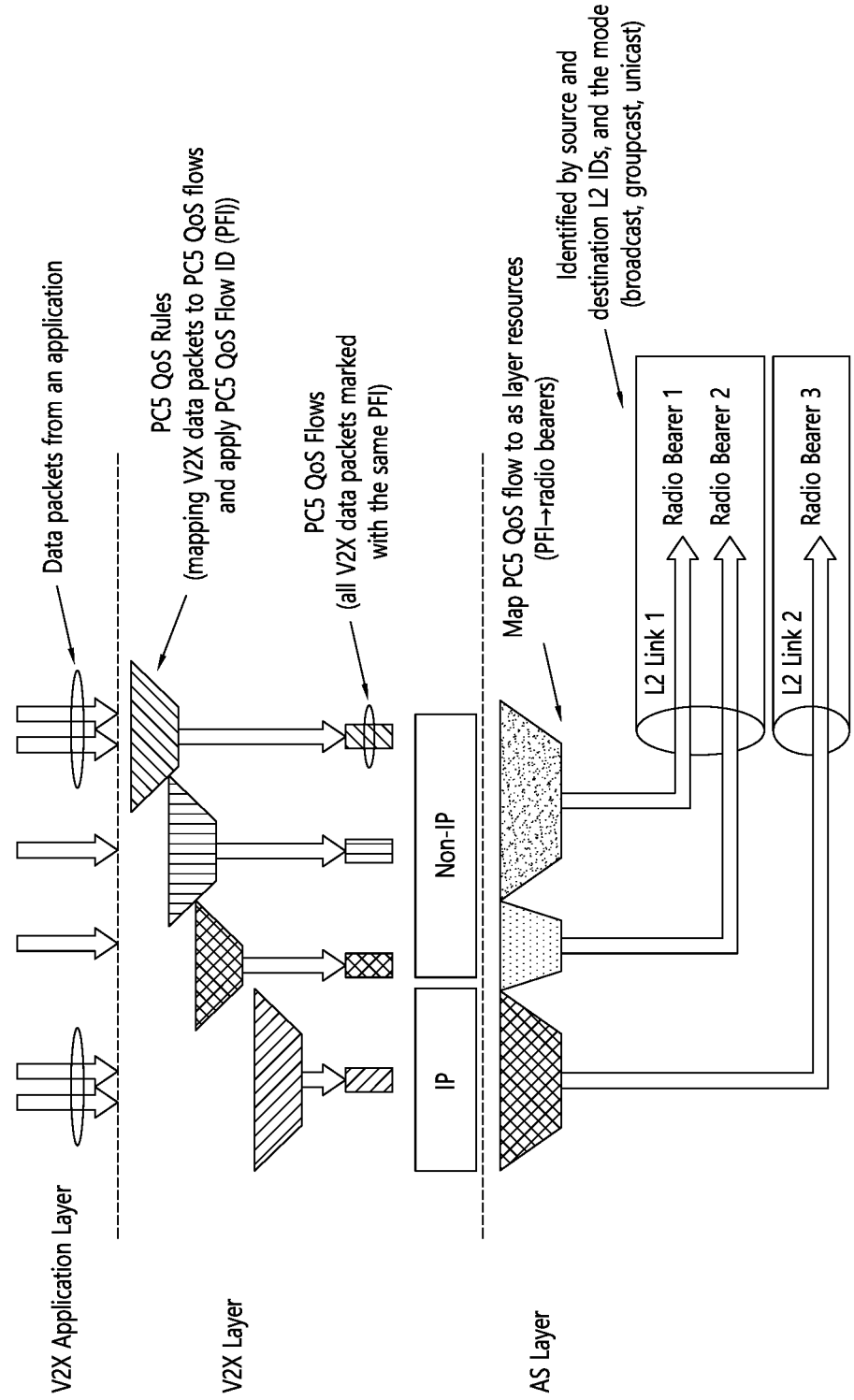
FIG. 13 shows an example of the classification and marking of user plane traffic using the PC5 QoS Rules, and the mapping of PC5 QoS Flows to radio resources at access stratum layer to which implementations of the present disclosure is applied.

FIG. 13 shows an example of the classification and marking of user plane traffic using the PC5 QoS Rules, and the mapping of PC5 QoS Flows to radio resources at access stratum layer to which implementations of the present disclosure is applied.

As illustrated in FIG. 13, for a given pair of source and destination Layer-2 IDs, there can be multiple radio bearers, each corresponding to a different PC5 QoS level. The AS layer can determine the mapping of multiple PC5 QoS Flows to the same radio bearer based on the information provided. For broadcast and groupcast, the L2 link goes to all UEs in proximity identified by the destination Layer-2 ID.

PC5 Packet Filter Set is described.

PC5 Packet Filter Set supports two types of packet filters, i.e. the IP Packet Filter Set and the V2X Packet Filter Set. A PC5 QoS Rule contains either the IP Packet Filter Set or the V2X Packet Filter Set.

The V2X Packet Filter Set shall support Packet Filters based on at least any combination of:
V2X Service Type (e.g. PSID or ITS-AID);
Source/Destination Layer-2 ID;
Application Layer ID (e.g. Station ID);
Extension parameters.
QoS handling for broadcast mode V2X communication over PC5 reference point is described.

When PC5 broadcast is used for the transmission of V2X service data, the following principles are followed for both network scheduled operation mode and UE autonomous resources selection mode:
PC5 QoS parameters are applied.
The V2X layer assigns a PC5 QoS Flow Identifier (PFI) and associates the PC5 QoS parameters to the PFI.
The V2X layer provides the PFI and PC5 QoS parameters to AS layer for Per-flow QoS model operations.
The V2X layer passes the V2X service data along with PFI to the AS layer for transmission.
When the autonomous resources selection mode is used, following additional principle applies:
The UE can use the PC5 QoS parameters for PC5 QoS handling.
QoS handling for unicast mode V2X communication over PC5 reference point is described.

The QoS handling is applied with the following additions:
The PFI and PC5 QoS parameters are negotiated during the Layer-2 link establishment procedure.
PC5 QoS parameters are described.
1. PQI is described.
A PQI is a special 5QI and is used as a reference to PC5 QoS characteristics, i.e. parameters that control QoS forwarding treatment for the packets over PC5 reference point.

Standardized PQI values have one-to-one mapping to a standardized combination of PC5 QoS characteristics.
2. PC5 Flow Bit Rates is described.
For GBR QoS Flows only, the following additional PC5 QoS parameters exist:
Guaranteed Flow Bit Rate (GFBR);
Maximum Flow Bit Rate (MFBR).
The GFBR and MFBR are used for bit rate control on PC5 reference point over the Averaging Time Window. For PC5 communication, the same GFBR and MFBR are used for both directions.
3. PC5 Link Aggregated Bit Rates is described.
A PC5 unicast link is associated with the following aggregate rate limit QoS parameter:
per link Aggregate Maximum Bit Rate (PC5 LINK-AMBR).
The PC5 LINK-AMBR limits the aggregate bit rate that can be expected to be provided across all Non-GBR QoS Flows with a peer UE over PC5 unicast link. The PC5 LINK-AMBR is measured over an AMBR averaging window which is a standardized value. The PC5 LINK-AMBR is not applicable to GBR QoS Flows.

For example, the AMBR averaging window is only applied to PC5 LINK-AMBR measurement.
4. Range is described.
The Range value indicates the applicability of the PC5 QoS parameters in PC5 communication, i.e. when the receiving UEs are not within the Range specified distance from the transmitting UE, the communication is best effort. Lower layer (PHY/MAC layer) may use the Range to determine the corresponding packet handling, e.g. HARQ, to achieve the QoS guarantee indicated by PC5 QoS parameters.

Range is in the unit of meters. The UE is configured with the maximum Range value it can use for a particular V2X service. A V2X service may request a different range value, and the V2X layer ensures that it does not exceed the maximum Range value.

Range is only used for groupcast communication over PC5 reference point.
5. Default Values are described.
A UE may be configured with default values for PC5 QoS parameters for a particular service, e.g. identified by PSID/ITS-AID. The default value will be used if the corresponding PC5 QoS parameter is not provided by upper layer.

Hereinafter, Resource allocation is described. It may be referred to as Section 5.3 of 3GPP TS 38.885 V16.0.0.

The study defines at least the following two SL resource allocation modes:
Mode 1: BS schedules SL resource(s) to be used by UE for SL transmission(s).
Mode 2: UE determines, i.e. BS does not schedule, SL transmission resource(s) within SL resources configured by BS/network or pre-configured SL resources.
The definition of SL resource allocation Mode 2 covers:
a) UE autonomously selects SL resource for transmission
b) UE assists SL resource selection for other UE(s), a functionality which can be part of a), c), d)
c) UE is configured with NR configured grant (Type-1 like) for SL transmission d) UE schedules SL transmissions of other UEs Resource allocation Mode 2 is described.

Resource allocation Mode 2 supports reservation of SL resources at least for blind retransmission.

Sensing and resource (re-)selection is described.

Sensing- and resource (re-)selection-related procedures are supported for resource allocation Mode 2.

The sensing procedure considered is defined as decoding SCI(s) from other UEs and/or SL measurements. Decoding SCI(s) in this procedure provides at least information on SL resources indicated by the UE transmitting the SCI. The sensing procedure uses a L1 SL RSRP measurement based on SL DMRS when the corresponding SCI is decoded.

The resource (re-)selection procedure considered uses the results of the sensing procedure to determine resource(s) for SL transmission.

Mode 2(a) is described.

The study considers SL sensing and resource selection procedures for Mode 2(a), in the context of a semi-persistent scheme where resource(s) are selected for multiple transmissions of different TBs and a dynamic scheme where resource(s) are selected for each TB transmission.

The following techniques are studied to identify occupied SL resources:

Decoding of SL control channel transmissions

SL measurements

Detection of SL transmissions

The following aspects are studied for SL resource selection

How a UE selects resource for PSCCH and PSSCH transmission (and other SL physical channel/signals that are defined)

Which information is used by UE for resource selection procedure

Mode 2(c) is described.

For out-of-coverage operation, Mode 2(c) assumes a (pre-)configuration of single or multiple SL transmission patterns, defined on each SL resource pool. For in-coverage operation, Mode 2(c) assumes that gNB configuration indicates single or multiple SL transmission patterns, defined on each SL resource pool. If there is a single pattern configured to a transmitting UE, there is no sensing procedure executed by UE, while if multiple patterns are configured, there is a possibility of a sensing procedure.

A 'pattern' is defined by the size and position(s) of the resource in time and frequency, and the number of resources.

Mode 2(d) is described.

In the context of group-based SL communication, it supported for UE-A to inform its serving gNB about members UE-B, UE-C, and so on of a group, and for the gNB to provide individual resource pool configurations and/or individual resource configurations to each group member through UE-A. UE-A cannot modify the configurations, and there is no direct connection required between any member UE and the gNB. Higher-layer only signalling is used to provide the configurations. Such functionality is up to UE capability(ies).

Meanwhile, a wireless device could communicate with another wireless device via V2X communication. For example, a receiving user equipment (RX UE) may receive a sidelink message from a transmitting UE (TX UE). The RX UE and the TX UE may be decided relatively. For example, when a UE receives a sidelink message from another UE, the UE could be a RX UE. For other example, when the UE transmits a sidelink message to another UE, the UE may could be a TX UE.

When a RX UE detects that sidelink reception from a TX UE cannot meet quality of service (QoS) requirement, for example, QoS requirement related to the communication range, the RX UE may not need to send HARQ feedback to the TX UE. In this case, however, the TX UE may not consider the QoS quality in the sidelink transmission.

Therefore, studies for transmission based on QoS requirement in a wireless communication system.

Hereinafter, a method and apparatus for transmission based on QoS requirement in a wireless communication system, according to some embodiments of the present disclosure, will be described with reference to the following drawings.

The following drawings are created to explain specific embodiments of the present disclosure. The names of the specific devices or the names of the specific signals/messages/fields shown in the drawings are provided by way of example, and thus the technical features of the present disclosure are not limited to the specific names used in the following drawings. Herein, a wireless device may be referred to as a user equipment (UE).

Figure 14:
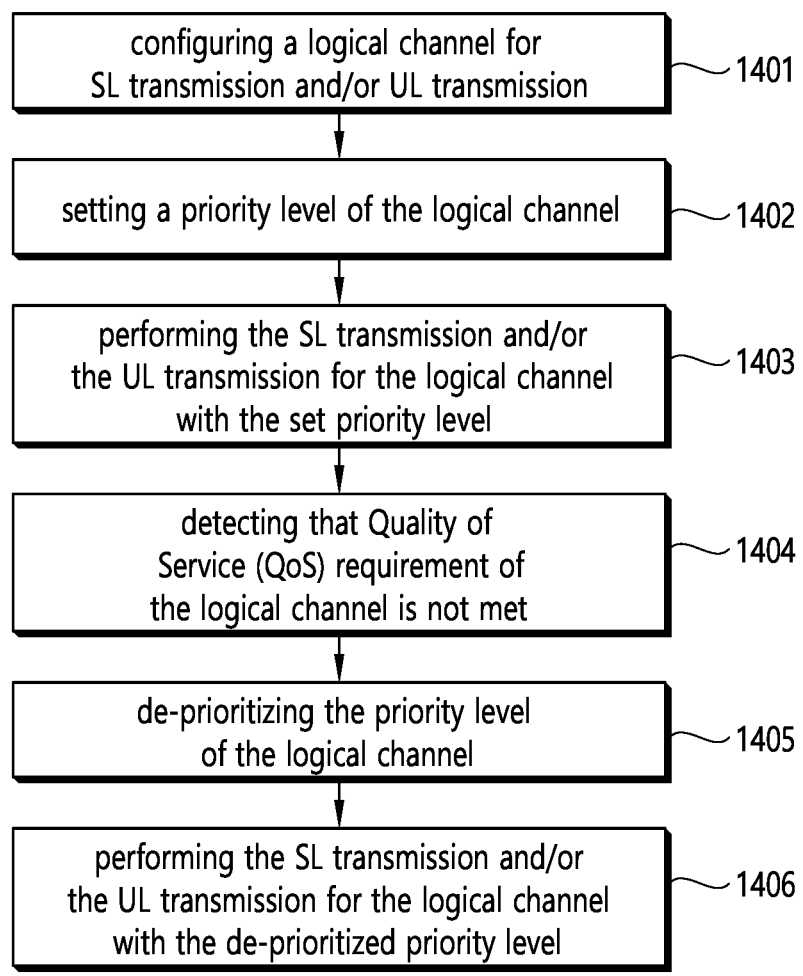
FIG. 14 shows an example of a method for transmission based on QoS requirement in a wireless communication system, according to some embodiments of the present disclosure.

FIG. 14 shows an example of a method for transmission based on QoS requirement in a wireless communication system, according to some embodiments of the present disclosure.

In particular, FIG. 14 shows an example of a method performed by a wireless device.

In step 1401, a wireless device may configure a logical channel for sidelink (SL) transmission and/or uplink (UL) transmission.

In step 1402, a wireless device may set a priority level of the logical channel.

For example, a wireless device may set the priority level of the logical channel to a first priority level mapped to a first priority value. The first priority value may be configured via dedicated signaling, system information, and/or pre-configuration by the network.

According to some embodiments of the present disclosure, the priority level may mapped to a priority value. A priority level of the logical channel may be mapped to each of a number. For example, the larger the priority value, the lower the priority level.

For example, a priority level for UL transmission may be mapped to each of a number between zero and 7. When a priority value approaches to zero, the priority level becomes higher. When a priority value approaches to 7, the priority becomes lower.

For other example, a priority level for SL transmission may be mapped to each of a number between 1 and 8. When a priority value approaches to 1, the priority level becomes higher. When a priority value approaches to 8, the priority level becomes lower.

In step 1403, a wireless device may perform the SL transmission and/or the UL transmission for the logical channel with the set priority level.

A wireless device may construct a Medium Access Control Protocol Data Unit (MAC PDU) from at least one of a MAC Service Data Unit (SDU) for the logical channel based on the set priority level. For example, a wireless device may transmit the constructed MAC PDU via the SL transmission and/or the UL transmission.

For example, a wireless device may construct a MAC PDU including the first priority value of the logical channel for a SL transmission. The wireless device may transmit the MAC PDU to another wireless device via SL transmission based on the included first priority value.

For other example, a wireless device may construct a MAC PDU including the first priority value of the logical channel for a UL transmission. The wireless device may transmit the MAC PDU to a network via UL transmission based on the included first priority value.

In step 1404, a wireless device may detect that Quality of Service (QoS) requirement of the logical channel is not met.

According to some embodiments of the present disclosure, the QoS requirement may include a communication range corresponding to distance between the wireless device and another wireless device for the SL transmission.

A wireless device may receive, from the other wireless device, information on location of the other wireless device. A wireless device may determine the distance between the wireless device and the other wireless device based on the information on the location. A wireless device may check whether the distance between the wireless device and the other wireless device is greater than the communication range or not. If the distance is smaller than or equal to the communication range, the wireless device may consider that the QoS requirement of the logical channel is met. Otherwise, if the distance is greater than the communication range, the wireless device may detect that the QoS requirement of the logical channel is not met.

According to some embodiments of the present disclosure, the QoS requirement may include a delay for the UL transmission and/or the SL transmission.

A wireless device may receive information on the delay for the UL transmission and/or the SL transmission from a network and/or another wireless device.

A wireless device may configure a delay threshold for each of the UL transmission and/or the SL transmission. For example, a wireless device may configure a UL delay threshold for UL transmission and a SL delay threshold for SL transmission.

A wireless device may check whether the delay from the network and/or the other wireless device satisfies the delay threshold. If the delay from the network and/or the other wireless device is equal to or less than the delay threshold, the wireless device may consider that the QoS requirement of the logical channel is met. Otherwise, if the delay from the network and/or the other wireless device is greater than the delay threshold, the wireless device may detect that the QoS requirement of the logical channel is not met.

In step 1405, a wireless device may de-prioritize the priority level of the logical channel.

For example, a wireless device may lower the priority level of the logical channel to a second priority level mapped to a second priority value, upon detecting that the QoS requirement of the logical channel is not met. For example, the second priority value may be greater than the first priority value. For example, the second priority value may be mapped to a lowest priority level.

In step 1406, a wireless device may perform the SL transmission and/or the UL transmission for the logical channel with the de-prioritized priority level.

According to some embodiments of the present disclosure, a wireless device may construct a Medium Access Control Protocol Data Unit (MAC PDU) from at least one of a MAC Service Data Unit (SDU) for the logical channel based on the de-prioritized priority level. A wireless device may transmit the constructed MAC PDU via the SL transmission and/or the UL transmission.

For example, a wireless device may construct a MAC PDU including the second priority value for SL transmission. A wireless device may transmit, to another wireless device, the MAC PDU based on the included second priority value.

For other example, a wireless device may construct a MAC PDU including the second priority value for UL transmission. A wireless device may transmit, to a network, the MAC PDU based on the included second priority value.

According to some embodiments of the present disclosure, a wireless device may configure a first logical channel for SL transmission and a second logical channel for UL transmission.

A wireless device may detect that the UL transmission and the SL transmission cannot be performed simultaneously. In this case, a wireless device may select one of the UL transmission or the SL transmission to perform based on a priority level of the first logical channel and a priority level of the second logical channel.

For example, a wireless device may detect that QoS requirement of the first logical channel is not met. Upon the detection, a wireless device may de-prioritize the priority level of the first logical channel. When the wireless device determine that the SL transmission for the first logical channel and the UL transmission for the second logical channel cannot be performed simultaneously, a wireless device may select the UL transmission for the second logical channel, since the de-prioritized priority level of the first logical channel is lower than or equal to the priority level of the second logical channel.

When a wireless device may detect that the QoS requirement of the first logical channel becomes to be met, a wireless device may set the priority level of the first logical channel mapped to an initial priority value. In this case, when the wireless device determine that the SL transmission for the first logical channel and the UL transmission for the second logical channel cannot be performed simultaneously, a wireless device may select the SL transmission for the first logical channel, since the initial priority level of the first logical channel is greater than the priority level of the second logical channel.

On other example, a wireless device may detect that QoS requirement of the second logical channel is not met. Upon the detection, a wireless device may de-prioritize the priority level of the second logical channel. When the wireless device determine that the SL transmission for the first logical channel and the UL transmission for the second logical channel cannot be performed simultaneously, a wireless device may select the SL transmission for the first logical channel, since the de-prioritized priority level of the second logical channel is lower than the priority level of the first logical channel.

When a wireless device may detect that the QoS requirement of the second logical channel becomes to be met, a wireless device may set the priority level of the second logical channel mapped to an initial priority value. In this case, when the wireless device determine that the SL transmission for the first logical channel and the UL transmission for the second logical channel cannot be performed simultaneously, a wireless device may select the UL transmission for the second logical channel, since the initial priority level of the second logical channel is greater than or equal to the priority level of the first logical channel.

According to some embodiments of the present disclosure, a wireless device may be in communication with at least one of a user equipment, a network, or an autonomous vehicle other than the wireless device.

Figure 15:
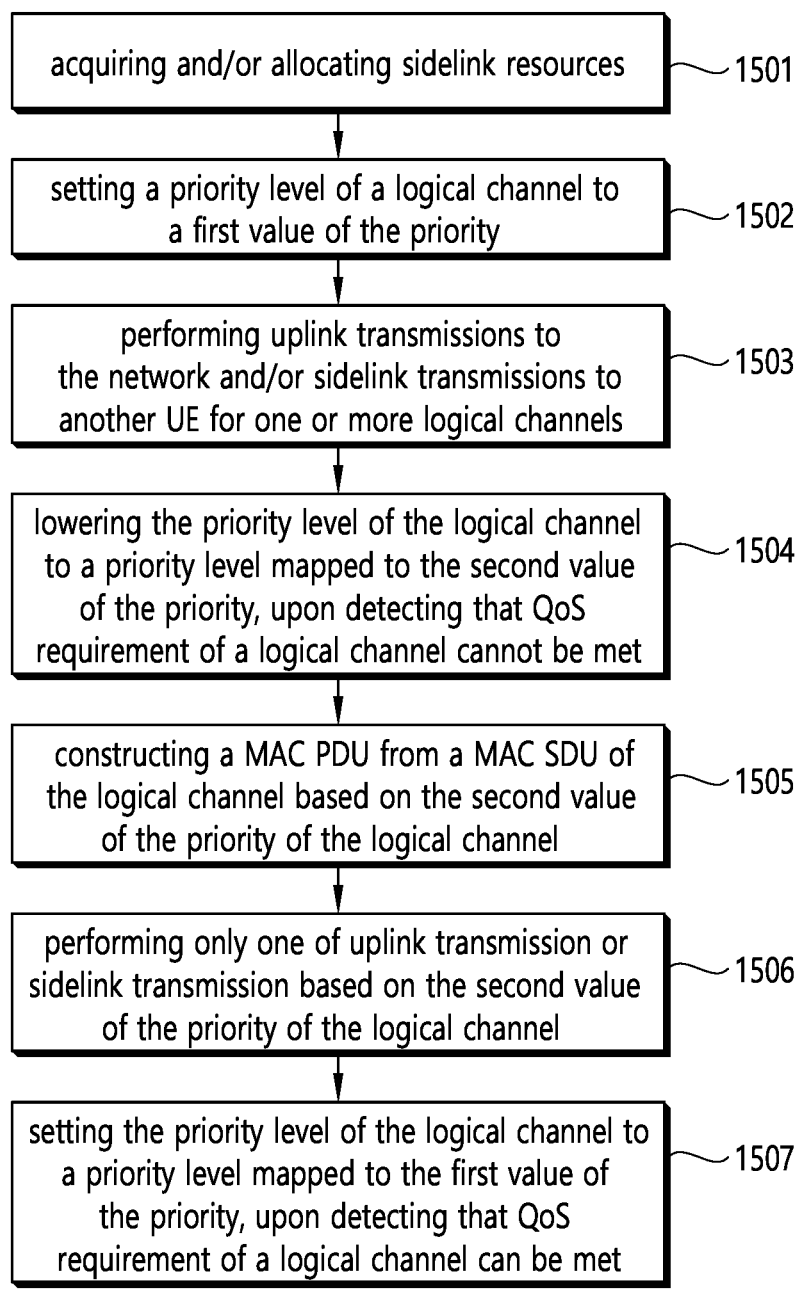
FIG. 15 shows an example of a method for performing data transmission based on QoS requirement by a wireless device in a wireless communication system, according to some embodiments of the present disclosure.

FIG. 15 shows an example of a method for performing data transmission based on QoS requirement by a wireless device in a wireless communication system, according to some embodiments of the present disclosure.

In particular, FIG. 15 shows an example of method performed by a wireless device, for example, a User Equipment (UE).

In step 1501, UE may acquire and/or allocate sidelink resources.

In step 1502, UE may set a priority level of a logical channel to a first value of the priority.

For example, the first value of the priority may be configured via dedicated signaling, system information and/or pre-configuration by a network.

For example, the logical channel may be either uplink logical channel or sidelink logical channel.

In step 1503, UE may perform uplink transmissions to the network and/or sidelink transmissions to another UE for one or more logical channels.

In step 1504, when the UE detects that QoS requirement of a logical channel cannot be met, the UE may lower the priority level of the logical channel to a priority level mapped to the second value of the priority.

For example, lowering the priority level may mean increasing the value of the priority. That is, the lower the priority level, the higher the value of the priority.

For example, the logical channel with the lowered priority level may be either uplink logical channel or sidelink logical channel.

For example, the QoS requirement may include a communication range corresponding to distance between two UEs in sidelink.

For example, the UE may consider the priority level of the logical channel as the lowest priority level of the logical channel for de-prioritization of the logical channel. That is, the second value of the priority may be the mapped to the lowest priority level.

In step 1505, when the UE performs logical channel prioritization for either sidelink transmission or uplink transmission, the UE may construct a MAC PDU from a MAC SDU of the logical channel, based on the second value of the priority of the logical channel.

In step 1506, when the UE cannot simultaneously perform uplink transmission of an uplink logical channel and sidelink transmission of a sidelink logical channel at the time of transmission, and when the uplink transmission collides with the sidelink transmission, the UE may perform only one of uplink transmission or sidelink transmission based on the second value of the priority of the logical channel.

In step 1507, when the UE detects that QoS requirement of a logical channel can be met, the UE may set the priority level of the logical channel to a priority level mapped to the first value of the priority.

Figure 16:
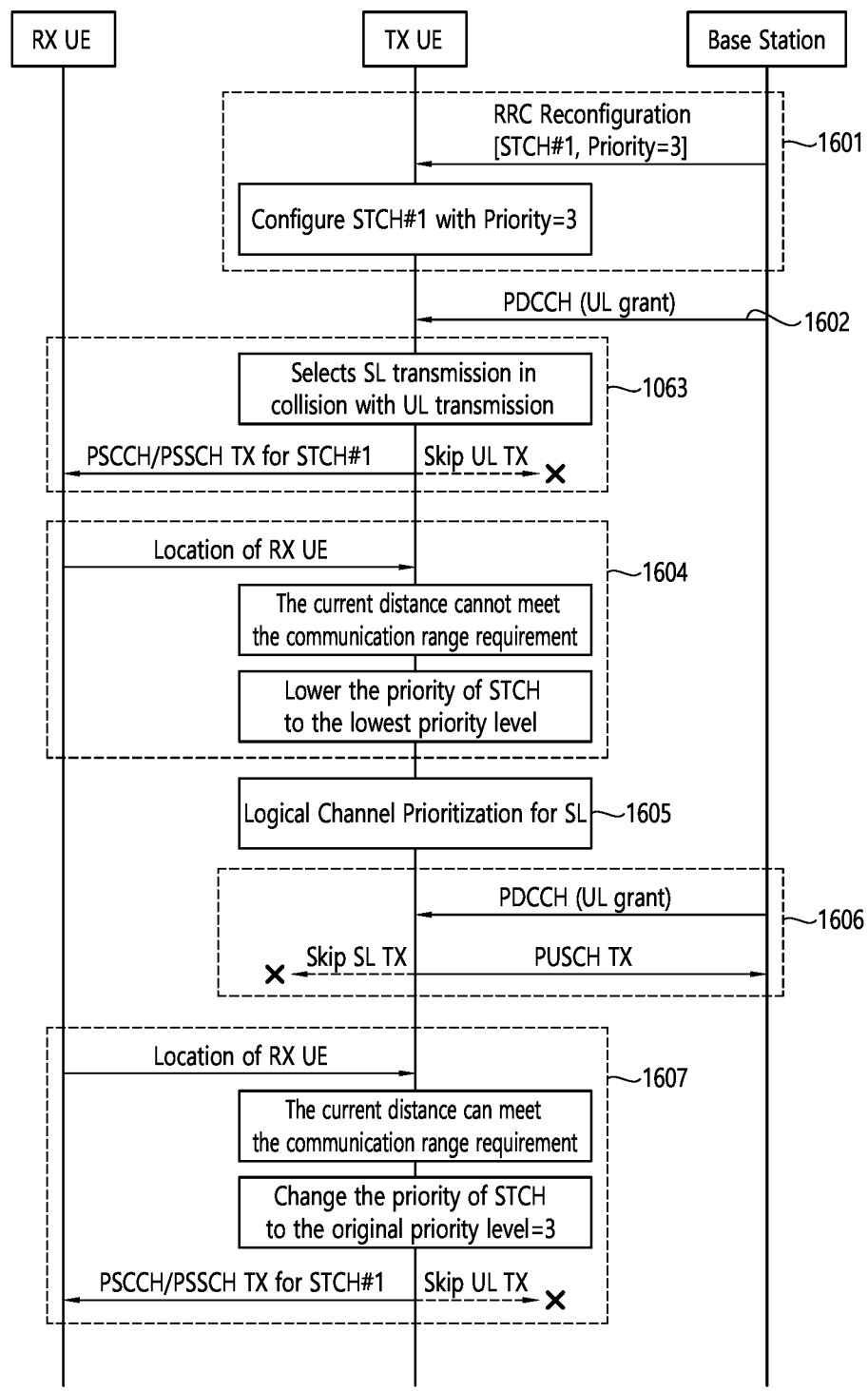
FIG. 16 shows an example of a method for performing data transmission based on QoS requirement in a wireless communication system, according to some embodiments of the present disclosure.

FIG. 16 shows an example of a method for performing data transmission based on QoS requirement in a wireless communication system, according to some embodiments of the present disclosure.

In particular FIG. 16 shows an example of sidelink data transmission of a MAC SDU from a UE, according to some embodiments of the present disclosure. However, it is clear that present disclosure is not limited thereto. The present disclosure could be applied to uplink data transmission as well.

In step 1601, upon reconfiguration, UE may establish a sidelink logical channel with a priority value set by the network. For example, the priority value of the sidelink logical channel, for example, Sidelink Traffic Channel #1 (STCH #1), may be set to 3. UE may also establish an uplink logical channel with a priority value set to 5.

In step 1602, if UE is in RRC_CONNECTED and configured for gNB scheduled sidelink resource allocation, UE may receive a grant from a network. For example, the gNB may send Downlink Control Information (DCI) in PDCCH to the UE. The DCI may include an allocated sidelink resource and/or an allocated uplink resource. UE may use the sidelink grant for transmission to the RX UE. UE may use the uplink grant for transmission to the gNB.

If UE is configured for UE autonomous scheduling of sidelink resource allocation regardless of RRC state, UE may autonomously select or reselect sidelink resources to create a sidelink grant used for transmission to the RX UE.

In step 1603, when uplink transmission of the uplink logical channel collides with sidelink transmission of the sidelink logical channel, UE may determine to perform the sidelink transmission based on comparison of the priority value of uplink logical channel with the priority value of sidelink logical channel.

Since the priority value of the sidelink logical channel (for example, 3) is lower than the priority value of the uplink logical channel (for example, 5), which means the priority level of the sidelink logical channel is higher than the priority level of the uplink logical channel, the UE determines to perform the sidelink transmission.

In this case, UE may perform the sidelink transmission to the RX UE. For example, TX UE may perform sidelink transmission to a RX UE via Physical Sidelink Control Channel (PSCCH) and/or Physical Sidelink Shared Channel (PSSCH) for the sidelink logical channel (for example, STCH #1). TX UE may skip to perform the uplink transmission.

In step 1604, UE may regularly check whether sidelink transmission meets QoS requirement such as communication range. For example, the communication range requirement can be set to 200 meters (ms) for the sidelink logical channel. Thus, if distance between two UEs (for example, the TX UE and the RX UE) is smaller than or equal to 200 ms, the UE may perform sidelink transmission with the originally set priority value (for example, 3). However, if distance between two UEs is beyond 200 ms, the UE may consider the priority level of the sidelink logical channel as the lowest priority level of the sidelink priority which may be mapped to the higher priority value, (for example, 8).

For example, the TX UE may receive a message including information on location of the RX UE. The TX UE may determine that the current distance cannot meet the communication range requirement.

For example, the TX UE may lowering the priority of the STCH #1 to the lowest priority level.

In step 1605, if data is available for transmission in SL buffer, UE may perform logical channel prioritization to create a MAC PDU based on the priority value or the priority level of the sidelink logical channel. If distance between two UEs is beyond the communication range requirement, the UE may consider the priority level of the sidelink logical channel as the lowest priority level of the priority which may be mapped to the higher priority value for example, 8. Thus, UE will deprioritize the sidelink logical channel to include a MAC SDU from the sidelink logical channel into a MAC PDU.

In step 1606, if the MAC SDU is included in the MAC PDU after logical channel prioritization for sidelink transmission, when sidelink transmission of this MAC PDU collides with uplink transmission of a MAC PDU from the uplink logical channel, and when the UE cannot simultaneously perform uplink transmission of the uplink logical channel and sidelink transmission of the sidelink logical channel at the time of transmission, the UE may select uplink transmission because of the lowered priority of the sidelink logical channel that has changed to a priority level mapped to the priority value of 8. The UE may perform uplink transmission only at a time in collision.

For example, the TX UE may receive UL grant by PDCCH. If the uplink transmission collides with the sidelink transmission, the TX UE may perform the uplink transmission via PUSCH. In this case, the TX UE may skip to perform the sidelink transmission to the RX UE.

In step 1607, if distance between two UEs becomes within the communication range requirement, the UE may set the priority of the sidelink logical channel to the original priority value (for example, 3). Thus, for next sidelink transmission, UE may use the original priority value of the sidelink logical channel in logical channel prioritization and collision with uplink transmission.

For example, the TX UE may receive a message including information on location of the RX UE. The TX UE may determine that the current distance can meet the communication range requirement.

For example, the TX UE may change the priority of the STCH #1 to the original priority level, for example 3.

For example, when the uplink transmission collides with the sidelink transmission, the TX UE may perform PSCCH transmission and/or PSSCH transmission for the STCH #1. In this case, the TX UE may skip the uplink transmission.

Hereinafter, a method for transmission based on QoS requirement in a wireless communication system, according to some embodiments of the present disclosure will be described. The method may be performed by a wireless device, for example, a UE.

According to some embodiments of the present disclosure, the UE may perform the sidelink HARQ operation below. For example, Sidelink HARQ entity of the UE may perform the sidelink HARQ operation below.

The MAC entity includes a Sidelink HARQ entity for transmission on SL-SCH, which maintains a number of parallel Sidelink processes.

The maximum number of transmitting Sidelink processes associated with each Sidelink HARQ Entity is [x]. A sidelink process may be configured for transmissions of multiple MAC PDUs. For transmissions of multiple MAC PDUs, the maximum number of transmitting Sidelink processes associated with each Sidelink HARQ Entity is [y].

A delivered sidelink grant and its associated HARQ information are associated with a Sidelink process. Each Sidelink process supports one TB. Each Sidelink process is associated with a HARQ process identifier.

For each sidelink grant, the Sidelink HARQ Entity shall:
1> identify the Sidelink process associated with this grant, and for each identified Sidelink process:
2> if the sidelink grant is used for initial transmission according to [x], and if no MAC PDU has been obtained:
3> obtain the MAC PDU to transmit from the Multiplexing and assembly entity, if any;
3> if a MAC PDU to transmit has been obtained:
4> deliver the MAC PDU and the sidelink grant and the HARQ information and the QoS information of the TB to the identified HARQ process;
4> instruct the identified HARQ process to trigger a new transmission;
3> else:
4> flush the HARQ buffer of the identified HARQ process.
2> else (i.e. retransmission):
3> if the sidelink grant received on PDCCH was addressed to SLCS-RNTI and if the HARQ buffer of the identified process is empty; or
3> if no negative acknowledgement is obtained for the most recent (re-)transmission of the TB:
4> ignore the sidelink grant.
3> else if HARQ feedback is configured for the Sidelink process and a negative acknowledgement is obtained for the most recent (re-)transmission of the TB:
4> deliver the sidelink grant and the HARQ information (redundancy version) of the TB to the identified HARQ process;
4> instruct the identified Sidelink process to trigger a retransmission.

According to some embodiments of the present disclosure, a UE may perform sidelink process as below.

The Sidelink process is associated with a HARQ buffer.

New transmissions and retransmissions are performed on the resource indicated in the sidelink grant and with the MCS selected.

If the sidelink process is configured to perform transmissions of multiple MAC PDUs the process maintains a counter SL_RESOURCE_RESELECTION_COUNTER. For other configurations of the sidelink process, this counter is not available.

If the Sidelink HARQ Entity requests a new transmission, the Sidelink process shall:
1> consider the NDI to have been toggled for the Sidelink process;
1> store the MAC PDU in the associated HARQ buffer;
1> store the sidelink grant received from the Sidelink HARQ Entity;
1> generate a transmission as described below;

If the Sidelink HARQ Entity requests a retransmission, the Sidelink process shall:
1> consider the NDI to have been not toggled for the Sidelink process;
1> generate a transmission as described below;

To generate a transmission, the Sidelink process shall:
1> if there is no uplink transmission; or if the MAC entity is able to simultaneously perform uplink transmission(s) and sidelink transmission at the time of the transmission; or if the other MAC entity (i.e. E-UTRA MAC entity) and the MAC entity are able to simultaneously perform uplink transmission(s) and sidelink transmission at the time of the transmission respectively:
2> instruct the physical layer to transmit SCI according to the stored sidelink grant with the associated HARQ information including the values of the NDI, the HARQ Process ID and the value of the highest priority of the logical channel(s) in the MAC PDU;
2> instruct the physical layer to generate a transmission according to the stored sidelink grant;
2> monitor PSFCH for the transmission, if configured.
1> if this transmission corresponds to the last transmission of the MAC PDU:
2> decrement SL_RESOURCE_RESELECTION_ COUNTER by 1, if available.

The transmission of the MAC PDU is prioritized over uplink transmissions if the following conditions are met:
1> if the MAC entity is not able to simultaneously perform all uplink transmissions and this sidelink transmission at the time of the transmission; and When/while the currently measured distance between a transmitting UE and a receiving UE cannot meet the communication range required for a logical channel, if the UE cannot perform UL and SL transmissions simultaneously, the UE deprioritizes the sidelink logical channel e.g. in the above steps. For example, the UE lowers the priority level of the sidelink logical channel by an offset or considers the priority of the logical channel as the lowest priority e.g. in the above steps. Or, the UE considers the priority of the uplink logical channel as the highest priority in the above steps.

According to some embodiments of the present disclosure, a UE may perform PSFCH reception as below.

If HARQ feedback is configured for a Sidelink process, the MAC entity shall:
1> for a PSFCH duration during which the MAC entity monitors PSFCH for the Sidelink process:
2> if an acknowledgement corresponding to the transmission is obtained from the physical layer:
3> deliver the acknowledgement to the corresponding Sidelink HARQ entity;
2> else:
3> deliver a negative acknowledgement to the corresponding Sidelink HARQ entity;
2> if the MAC entity has been configured for conveying SL HARQ feedback to the gNB: and
2> if CBR measured is below a threshold:
3> instruct the physical layer to signal the acknowledgement on the PUCCH.

According to some embodiments of the present disclosure, a UE may perform multiplexing and assembly as below.

For PDU(s) associated with one SCI, MAC shall consider only logical channels with the same Source Layer-2 ID-Destination Layer-2 ID pair. Multiple transmissions for different Sidelink processes are allowed to be independently performed in different PSSCH durations.

According to some embodiments of the present disclosure, a UE may perform logical channel prioritization as below.

The sidelink Logical Channel Prioritization procedure is applied whenever a new transmission is performed.

RRC controls the scheduling of sidelink data by signalling for each logical channel:
sl-priority where an increasing priority value indicates a lower priority level;
sl-prioritisedBitRate which sets the sidelink Prioritized Bit Rate (sPBR);
sl-bucketSizeDuration which sets the sidelink Bucket Size Duration (sBSD).

RRC additionally controls the LCP procedure by configuring mapping restrictions for each logical channel:
configuredSLGrantType1Allowed which sets whether a configured grant Type 1 can be used for sidelink transmission.

The following UE variable is used for the Logical channel prioritization procedure:
SBj which is maintained for each logical channel j.

The MAC entity shall initialize SBj of the logical channel to zero when the logical channel is established.

For each logical channel j, the MAC entity shall:
1> increment SBj by the product sPBR×T before every instance of the LCP procedure, where T is the time elapsed since SBj was last incremented;
1> if the value of SBj is greater than the sidelink bucket size (i.e. sPBR×sBSD):
2> set SBj to the sidelink bucket size.

The exact moment(s) when the UE updates SBj between LCP procedures is up to UE implementation, as long as SBj is up to date at the time when a grant is processed by LCP.

When/while the currently measured distance between a transmitting UE and a receiving UE cannot meet the communication range required for a logical channel, the UE deprioritizes the logical channel in LCP. For example, the UE lowers the priority level of the logical channel by an offset or considers the priority of the logical channel as the lowest priority in LCP.

Hereinafter, an apparatus for transmission based on QoS requirement in a wireless communication system, according to some embodiments of the present disclosure, will be described. Herein, the apparatus may be a wireless device (100 or 200) in FIGS. 2, 3, and 5.

For example, a wireless device may perform methods described above. The detailed description overlapping with the above-described contents could be simplified or omitted.

Referring to FIG. 5, a wireless device 100 may include a processor 102, a memory 104, and a transceiver 106.

According to some embodiments of the present disclosure, the processor 102 may be configured to be coupled operably with the memory 104 and the transceiver 106.

The processor 102 may be configured to configure a logical channel for sidelink (SL) transmission and/or uplink (UL) transmission. The processor 102 may be configured to set a priority level of the logical channel. The processor 102 may be configured to control the transceiver 106 to perform the SL transmission and/or the UL transmission for the logical channel with the set priority level. The processor 102 may be configured to detect that Quality of Service (QoS) requirement of the logical channel is not met. The processor 102 may be configured to de-prioritize the priority level of the logical channel. The processor 102 may be configured to control the transceiver 106 to perform the SL transmission and/or the UL transmission for the logical channel with the de-prioritized priority level.

According to some embodiments of the present disclosure, the QoS requirement may include a communication range corresponding to distance between the wireless device and another wireless device for the SL transmission.

For example, the processor 102 may be configured to control the transceiver 106 to receive, from the other wireless device, information on location of the other wireless device.

According to some embodiments of the present disclosure, the QoS requirement may include a delay for the UL transmission and/or the SL transmission.

For example, the processor 102 may be configured to control the transceiver 106 to receive information on the delay for the UL transmission and/or the SL transmission from a network and/or another wireless device.

According to some embodiments of the present disclosure, the processor 102 may be configured to set the priority level of the logical channel to a first priority level mapped to a first priority value. For example, the first priority value may be configured via dedicated signaling, system information, and/or pre-configuration by a network.

According to some embodiments of the present disclosure, the processor 102 may be configured to de-prioritize the priority level of the logical channel by lowering the priority level of the logical channel to a second priority level mapped to a second priority value. For example, the second priority value may be greater than the first priority value. For example, the second priority value may be mapped to a lowest priority level.

According to some embodiments of the present disclosure, the processor 102 may be configured to configure a first logical channel for SL transmission and a second logical channel for UL transmission. The processor 102 may be configured to detect that the UL transmission and the SL transmission cannot be performed simultaneously. The processor 102 may be configured to select one of the UL transmission or the SL transmission to perform based on a priority level of the first logical channel and a priority level of the second logical channel.

According to some embodiments of the present disclosure, the processor 102 may be configured to construct a Medium Access Control Protocol Data Unit (MAC PDU) from at least one of a MAC Service Data Unit (SDU) for the logical channel based on the de-prioritized priority level.

For example, the processor 102 may be configured to control the transceiver 106 to transmit the constructed MAC PDU via the SL transmission and/or the UL transmission.

According to some embodiments of the present disclosure, the processor 102 may be configured to be in communication with at least one of a user equipment, a network, or an autonomous vehicle other than the wireless device.

Hereinafter, a processor for a wireless device for transmission based on QoS requirement in a wireless communication system, according to some embodiments of the present disclosure, will be described.

The processor may be configured to control the wireless device to configure a logical channel for sidelink (SL) transmission and/or uplink (UL) transmission. The processor may be configured to control the wireless device to set a priority level of the logical channel. The processor may be configured to control the wireless device to perform the SL transmission and/or the UL transmission for the logical channel with the set priority level. The processor may be configured to control the wireless device to detect that Quality of Service (QoS) requirement of the logical channel is not met. The processor may be configured to control the wireless device to de-prioritize the priority level of the logical channel. The processor may be configured to control the wireless device to perform the SL transmission and/or the UL transmission for the logical channel with the de-prioritized priority level.

According to some embodiments of the present disclosure, the QoS requirement may include a communication range corresponding to distance between the wireless device and another wireless device for the SL transmission.

For example, the processor may be configured to control the wireless device to receive, from the other wireless device, information on location of the other wireless device.

According to some embodiments of the present disclosure, the QoS requirement may include a delay for the UL transmission and/or the SL transmission.

For example, the processor may be configured to control the wireless device to receive information on the delay for the UL transmission and/or the SL transmission from a network and/or another wireless device.

According to some embodiments of the present disclosure, the processor may be configured to control the wireless device to set the priority level of the logical channel to a first priority level mapped to a first priority value. For example, the first priority value may be configured via dedicated signaling, system information, and/or pre-configuration by a network.

According to some embodiments of the present disclosure, the processor may be configured to control the wireless device to de-prioritize the priority level of the logical channel by lowering the priority level of the logical channel to a second priority level mapped to a second priority value. For example, the second priority value may be greater than the first priority value. For example, the second priority value may be mapped to a lowest priority level.

According to some embodiments of the present disclosure, the processor may be configured to control the wireless device to configure a first logical channel for SL transmission and a second logical channel for UL transmission. The processor may be configured to control the wireless device to detect that the UL transmission and the SL transmission cannot be performed simultaneously. The processor may be configured to control the wireless device to select one of the UL transmission or the SL transmission to perform based on a priority level of the first logical channel and a priority level of the second logical channel.

According to some embodiments of the present disclosure, the processor may be configured to control the wireless device to construct a Medium Access Control Protocol Data Unit (MAC PDU) from at least one of a MAC Service Data Unit (SDU) for the logical channel based on the de-prioritized priority level.

For example, the processor may be configured to control the wireless device to transmit the constructed MAC PDU via the SL transmission and/or the UL transmission.

According to some embodiments of the present disclosure, the processor may be configured to control the wireless device to be in communication with at least one of a user equipment, a network, or an autonomous vehicle other than the wireless device.

Hereinafter, a non-transitory computer-readable medium has stored thereon a plurality of instructions for transmission based on QoS requirement in a wireless communication system, according to some embodiments of the present disclosure, will be described.

According to some embodiment of the present disclosure, the technical features of the present disclosure could be embodied directly in hardware, in a software executed by a processor, or in a combination of the two. For example, a method performed by a wireless device in a wireless communication may be implemented in hardware, software, firmware, or any combination thereof. For example, a software may reside in RAM memory, flash memory, ROM memory, EPROM memory, EEPROM memory, registers, hard disk, a removable disk, a CD-ROM, or any other storage medium.

Some example of storage medium is coupled to the processor such that the processor can read information from the storage medium. In the alternative, the storage medium may be integral to the processor. The processor and the storage medium may reside in an ASIC. For other example, the processor and the storage medium may reside as discrete components.

The computer-readable medium may include a tangible and non-transitory computer-readable storage medium.

For example, non-transitory computer-readable media may include random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, or any other medium that can be used to store instructions or data structures. Non-transitory computer-readable media may also include combinations of the above.

In addition, the method described herein may be realized at least in part by a computer-readable communication medium that carries or communicates code in the form of instructions or data structures and that can be accessed, read, and/or executed by a computer.

According to some embodiment of the present disclosure, a non-transitory computer-readable medium has stored thereon a plurality of instructions. The stored a plurality of instructions may be executed by a processor of a wireless device.

The stored a plurality of instructions may cause the wireless device to configure a logical channel for sidelink (SL) transmission and/or uplink (UL) transmission. The stored a plurality of instructions may cause the wireless device to set a priority level of the logical channel. The stored a plurality of instructions may cause the wireless device to perform the SL transmission and/or the UL transmission for the logical channel with the set priority level. The stored a plurality of instructions may cause the wireless device to detect that Quality of Service (QoS) requirement of the logical channel is not met. The stored a plurality of instructions may cause the wireless device to de-prioritize the priority level of the logical channel. The stored a plurality of instructions may cause the wireless device to perform the SL transmission and/or the UL transmission for the logical channel with the de-prioritized priority level.

According to some embodiments of the present disclosure, the QoS requirement may include a communication range corresponding to distance between the wireless device and another wireless device for the SL transmission.

For example, the stored a plurality of instructions may cause the wireless device to receive, from the other wireless device, information on location of the other wireless device.

According to some embodiments of the present disclosure, the QoS requirement may include a delay for the UL transmission and/or the SL transmission.

For example, the stored a plurality of instructions may cause the wireless device to receive information on the delay for the UL transmission and/or the SL transmission from a network and/or another wireless device.

According to some embodiments of the present disclosure, the stored a plurality of instructions may cause the wireless device to set the priority level of the logical channel to a first priority level mapped to a first priority value. For example, the first priority value may be configured via dedicated signaling, system information, and/or pre-configuration by a network.

According to some embodiments of the present disclosure, the stored a plurality of instructions may cause the wireless device to de-prioritize the priority level of the logical channel by lowering the priority level of the logical channel to a second priority level mapped to a second priority value. For example, the second priority value may be greater than the first priority value. For example, the second priority value may be mapped to a lowest priority level.

According to some embodiments of the present disclosure, the stored a plurality of instructions may cause the wireless device to configure a first logical channel for SL transmission and a second logical channel for UL transmission. The stored a plurality of instructions may cause the wireless device to detect that the UL transmission and the SL transmission cannot be performed simultaneously. The stored a plurality of instructions may cause the wireless device to select one of the UL transmission or the SL transmission to perform based on a priority level of the first logical channel and a priority level of the second logical channel.

According to some embodiments of the present disclosure, the stored a plurality of instructions may cause the wireless device to construct a Medium Access Control Protocol Data Unit (MAC PDU) from at least one of a MAC Service Data Unit (SDU) for the logical channel based on the de-prioritized priority level.

For example, the stored a plurality of instructions may cause the wireless device to transmit the constructed MAC PDU via the SL transmission and/or the UL transmission.

According to some embodiments of the present disclosure, the stored a plurality of instructions may cause the wireless device to be in communication with at least one of a user equipment, a network, or an autonomous vehicle other than the wireless device.

Hereinafter, a method for transmission based on QoS requirement performed by a base station (BS) in a wireless communication system, according to some embodiments of the present disclosure, will be described.

The BS may transmit, to a wireless device, configuration for a logical channel for sidelink (SL) transmission and/or uplink (UL) transmission. The BS may transmit, to the wireless device, configuration for a priority level of the logical channel for the wireless device. The BS may receive, from the wireless device, the SL transmission and/or the UL transmission for the logical channel with the configured priority level. The BS may receive, from the wireless device, another SL transmission and/or another UL transmission for the logical channel with de-prioritized priority level.

Hereinafter, a base station (BS) for transmission based on QoS requirement in a wireless communication system, according to some embodiments of the present disclosure, will be described.

The BS may include a transceiver, a memory, and a processor operatively coupled to the transceiver and the memory.

The processor may be configured to control the transceiver to transmit, to a wireless device, configuration for a logical channel for sidelink (SL) transmission and/or uplink (UL) transmission. The processor may be configured to control the transceiver to transmit, to the wireless device, configuration for a priority level of the logical channel for the wireless device. The processor may be configured to control the transceiver to receive, from the wireless device, the SL transmission and/or the UL transmission for the logical channel with the configured priority level. The processor may be configured to control the transceiver to receive, from the wireless device, another SL transmission and/or another UL transmission for the logical channel with de-prioritized priority level.

The present disclosure can have various advantageous effects.

According to some embodiments of the present disclosure, a wireless device could perform uplink (UL) transmission and/or (SL) sidelink transmission efficiently based on QoS requirement in a wireless communication system.

For example, a wireless device could perform prioritization and/or de-prioritization in UL transmission and/or SL transmission by adjusting the priority of logical channel for UL transmissions and/or SL transmissions.

For example, a wireless device could perform prioritization and/or de-prioritization when QoS requirement of the logical channel cannot be temporarily met.

For example, a wireless communication system could provide de-prioritization based on adjustment of a priority of a packet for a wireless device performing transmission.

Advantageous effects which can be obtained through specific embodiments of the present disclosure are not limited to the advantageous effects listed above. For example, there may be a variety of technical effects that a person having ordinary skill in the related art can understand and/or derive from the present disclosure. Accordingly, the specific effects of the present disclosure are not limited to those explicitly described herein, but may include various effects that may be understood or derived from the technical features of the present disclosure.

Claims in the present disclosure can be combined in a various way. For instance, technical features in method claims of the present disclosure can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method. Other implementations are within the scope of the following claims.

What is claimed is:

1. A method performed by a wireless device in a wireless communication system, the method comprising,
    configuring a logical channel for device-to-device direct transmission and/or uplink transmission;
    setting a priority level of the logical channel to a first priority level mapped to a first priority value;
    performing the device-to-device direct transmission and/or the uplink transmission for the logical channel with the set priority level;
    detecting that a Quality of Service requirement of the logical channel is not met;
    lowering the priority level of the logical channel to a second priority level mapped to a second priority value, wherein the second priority value is greater than the first priority value; and
    performing the device-to-device direct transmission and/or the uplink transmission for the logical channel with the second priority level.

2. The method of claim 1, wherein the Quality of Service requirement includes a communication range corresponding to distance between the wireless device and another wireless device for the device-to-device direct transmission.

3. The method of claim 2, wherein the method further comprises,
    receiving, from the other wireless device, information on location of the other wireless device.

4. The method of claim 1, wherein the Quality of Service requirement includes a delay for the uplink transmission and/or the device-to-device direct transmission.

5. The method of claim 4, wherein the method further comprises,
    receiving information on the delay for the uplink transmission and/or the device-to-device direct transmission from a network and/or another wireless device.

6. The method of claim 1,
    wherein the first priority value is configured via dedicated signaling, system information, and/or pre-configuration by a network.

7. The method of claim 1, wherein the second priority value is mapped to a lowest priority level.

8. The method of claim 1, wherein the method further comprises,
    configuring a first logical channel for device-to-device direct transmission and a second logical channel for uplink transmission;
    detecting that the uplink transmission and the device-to-device direct transmission cannot be performed simultaneously; and
    selecting one of the uplink transmission or the device-to-device direct transmission to perform based on a priority level of the first logical channel and a priority level of the second logical channel.

9. The method of claim 1, wherein the method further comprises,
    constructing a Medium Access Control Protocol Data Unit (MAC PDU) from at least one of a MAC Service Data Unit (SDU) for the logical channel based on the second priority level.

10. The method of claim 9, wherein the method further comprises,
    transmitting the constructed MAC PDU via the device-to-device direct transmission and/or the uplink transmission.

11. The method of claim 1, wherein the wireless device is in communication with at least one of a user equipment, a network, or an autonomous vehicle other than the wireless device.

12. A wireless device in a wireless communication system comprising:
    a transceiver;
    a memory; and
    at least one processor operatively coupled to the transceiver and the memory, and configured to:
    configure a logical channel for device-to-device direct transmission and/or uplink transmission;
    set a priority level of the logical channel to a first priority level mapped to a first priority value;
    control the transceiver to perform the device-to-device direct transmission and/or the uplink transmission for the logical channel with the set priority level;
    detect that a Quality of Service (QOS) requirement of the logical channel is not met;
    lower the priority level of the logical channel to a second priority level mapped to a second priority value, wherein the second priority value is greater than the first priority value; and
    control the transceiver to perform the device-to-device direct transmission and/or the uplink transmission for the logical channel with the de prioritized second priority level.

13. The wireless device of claim 12, wherein the Quality of Service requirement includes a communication range corresponding to distance between the wireless device and another wireless device for the device-to-device direct transmission.

14. The wireless device of claim 13, wherein the at least one processor is further configured to,
    control the transceiver to receive, from the other wireless device, information on location of the other wireless device.

15. The wireless device of claim 12, wherein the Quality of Service requirement includes a delay for the uplink transmission and/or the device-to-device direct transmission.

16. The wireless device of claim 15, wherein the at least one processor is further configured to,
    control the transceiver to receive information on the delay for the uplink transmission and/or the device-to-device direct transmission from a network and/or another wireless device.

17. The wireless device of claim 12,
    wherein the first priority value is configured via dedicated signaling, system information, and/or pre-configuration by a network.

18. A non-transitory computer-readable medium having stored thereon a plurality of instructions, which, when executed by a processor of a wireless device, cause the wireless device to:
    configure a logical channel for device-to-device direct transmission and/or uplink transmission;

set a priority level of the logical channel to a first priority level mapped to a first priority value;
perform the device-to-device direct transmission and/or the uplink transmission for the logical channel with the set priority level;
detect that a Quality of Service requirement of the logical channel is not met;
lower the priority level of the logical channel to a second priority level mapped to a second priority value, wherein the second priority value is greater than the first priority value; and
perform the device-to-device direct transmission and/or the uplink transmission for the logical channel with the second priority level.

* * * * *